United States Patent [19]

Hough et al.

[11] Patent Number: 5,063,736

[45] Date of Patent: Nov. 12, 1991

[54] PARTICULATE FILTER TRAP LOAD REGENERATION SYSTEM

[75] Inventors: Walter J. Hough; Paul R. Miller, both of Columbus, Ind.

[73] Assignee: Cummins Engine Company, Inc., Columbus, Ind.

[21] Appl. No.: 388,675

[22] Filed: Aug. 2, 1989

[51] Int. Cl.$^5$ .................................................. F01N 3/02
[52] U.S. Cl. ........................................ 60/286; 55/466;
55/DIG. 30; 60/288; 60/311
[58] Field of Search .............. 60/286, 311, 288, 274;
55/466, DIG. 30

[56] References Cited

U.S. PATENT DOCUMENTS

| | | |
|---|---|---|
| 2,829,731 | 4/1958 | Clayton . |
| 3,209,532 | 10/1965 | Morris et al. . |
| 3,254,483 | 6/1966 | Martin et al. . |
| 3,285,709 | 11/1966 | Ennarino et al. . |
| 3,577,728 | 5/1971 | Von Brimer et al. . |
| 3,645,093 | 2/1972 | Thomas . |
| 3,656,303 | 4/1972 | La Force . |
| 3,667,494 | 6/1972 | Haase . |
| 4,114,372 | 9/1978 | Ikeura . |
| 4,121,546 | 10/1978 | Hattori et al. . |
| 4,158,610 | 6/1979 | Bauer et al. . |
| 4,404,795 | 9/1983 | Oishi et al. . |
| 4,441,971 | 4/1984 | Ishiguro et al. . |
| 4,492,079 | 1/1985 | Takagi ........................ 60/286 |
| 4,509,371 | 4/1985 | Wellman . |
| 4,544,388 | 10/1985 | Rao et al. . |
| 4,567,725 | 2/1986 | Shinzawa et al. . |
| 4,603,550 | 8/1986 | Shinzawa . |
| 4,608,640 | 8/1986 | Shinzawa et al. . |
| 4,610,138 | 9/1986 | Shinzawa et al. . |
| 4,630,438 | 12/1986 | Shinzawa . |
| 4,656,832 | 4/1987 | Yukihisa et al. . |
| 4,899,540 | 2/1990 | Wagner ........................ 60/286 |

OTHER PUBLICATIONS

"Performance and Regeneration Characteristics of a Cellular Ceramic Diesel Particulate Trap" pp. 66-87, Z. N. Mogaka, V. W. Wong and S. M. Shahed of Cummins Engine Company. (SAE paper) 1982.

"Laboratory Results in Particulate Trap Technology" by Signer Meinrad of Diesel Engine Research and Engineering Co., Ltd. and Cornetti Giorgio, Engine Engineering, IVECO Fiat S. p. A., pp. 11-18. (SAE paper) 1989.

"Development of a Ceramic Particulate Trap for Urban Buses", G. M. Cornetti, P. P. Messori, and C. Operti, IVECO Engineering, Torino, Italy (ASME paper) 1989.

*Primary Examiner*—Douglas Hart
*Attorney, Agent, or Firm*—Sixbey, Friedman, Leedom & Ferguson

[57] ABSTRACT

A particulate filter trap regeneration system and control mechanism is disclosed including a downstream vent tube section across which a pressure signal is derived as an analog of the exhaust gas stream velocity flowing through the particulate trap. A novel particulate loading parameter formula is disclosed by which the maximum acceptable pressure drop across a loaded particulate trap may be calculated and related to exhaust gas flow through the trap in order to determine when particulate trap regeneration should commence. In one embodiment, a vent tube equipped with a venturi throat for increasing the accuracy of the pressure signal indicative of exhaust gas stream velocity is disclosed along with representative dimensional parameters.

22 Claims, 6 Drawing Sheets

PARTICULATE FILTER TRAP LOAD REGENERATION SYSTEM

TECHNICAL FIELD

This invention relates to an apparatus for controlling the operation of a system for regenerating a particulate filter trap by accurately determining the amount of trapped particulate matter. More particularly, this invention relates to a system for detecting the load of particulate matter within a particulate filter trap to initiate regeneration of the system when the load reaches a pre-set limit.

BACKGROUND OF THE INVENTION

By the year 1991, the particulate emission standards set by the Environmental Protection Agency (EPA) will require all urban buses to emit less than 0.1 gm/hp-hr of particulate matter. The same standard will apply to heavy duty trucks in 1994. Particulates are defined by the EPA as any matter in the exhaust of an internal combustion engine, other than condensed water, which is capable of being collected by a standard filter after dilution with ambient air at a temperature of 125 degrees Fahrenheit. Included in this definition are agglomerated carbon particles, absorbed hydrocarbons, including known carcinogens, and sulfates.

These particulates are very small in size, with a mass median diameter in the range of 0.1-1.0 micrometers, and are extremely light weight. Particulate filter traps have been developed which are effective to remove a sufficient quantity of the particulates from the exhaust gas of a typical diesel engine for a truck or bus to bring the exhaust emissions into compliance with the EPA regulations. During normal operations of a typical vehicle engine, approximately 20 cubic feet of particulate matter must be trapped per 100,000 miles of vehicle operation. Obviously this particulate matter cannot be stored within the vehicle. Therefore successful long term operation of a particulate trap-based exhaust aftertreatment system (EAS) requires some method for removal of the trapped particulates. One method which has proven to be successful has been to provide means to burn off the trapped particles to regenerate the filter. See for example Mogaka et al., "Performance and Regeneration Characteristics of a Cellular Ceramic Diesel Particulate Trap," SAE Paper No. 82 0272, published Feb. 22-26, 1982. The regeneration process is typically initiated by a control system and is carried out by the delivery of heat to the inlet of the particulate trap at a temperature in excess of 1200 degrees Fahrenheit. The process results in oxidation of the filtered carbonaceous particulates in a manner that restores the trap's "clean" flow restriction but unavoidably produces temperature gradients and resultant thermal stresses in the particulate trap. The magnitude of these stresses must be controlled to a level that will not result in fatigue failure of the filter within its designed operating life.

A number of factors influence the magnitude of the stresses such as regeneration gas flow rate, oxygen concentration, and trap inlet temperature distribution, all of which are determined by physical characteristics of the system design and hence are "fixed." The single most important, non-fixed factor in determining the magnitude of these stresses, and hence the life of the system is, the mass of particulates that is allowed to accumulate in the trap before the control system actively initiates the regeneration process. Should a trap be allowed to become excessively loaded with particulates, it can be predicted that, upon regeneration by burn off, deleterious thermal stress fatigue will result.

One solution to the problem would be to burn off the trapped particulates at very frequent intervals but such a technique would be wasteful of the fuel needed to promote the burn off, and be partially self defeating of the ultimate purpose of particulate emission reduction since during burn off, the engine exhaust gases may be in some systems released to the atmosphere without filtration. Obviously, a need exists for determining as accurately as possible the mass of particles actually trapped but this need must be weighed against the expense and complexity of the sensing means used to make the determination. It can thus be seen that the means of determining the mass of particulates in the trap and therefore the means of deciding "when" to regenerate is by far the most crucial aspect of the control system.

Fundamental to the design of a control system is the choice of physical parameters which are to be sensed to determine trap "loading" which in turn is dependent on the selection of a quantifiable parameter representing the degree to which a filter is loaded with particles. One approach has been to define a dimensionless parameter (M) equal to the ratio of the dimensionless pressure drop (pressure drop divided by the kinetic pressure, $\frac{1}{2}\epsilon V^2$) across a loaded trap to that across a clean trap at the same Reynolds number, i.e.

$$M = \frac{\Delta P \text{ loaded}/(\frac{1}{2} \rho v^2)}{\Delta P \text{ clean}/(\frac{1}{2} \rho v^2)}$$

wherein
V = flow rate of exhaust gas stream
$\rho$ = gas Density

Obviously, M = 1 for a clean trap and is greater than 1 for a loaded trap. See pages 70 and 71 Magaka et al, supra. Measurement of the pressure drop across a loaded trap is fairly straight forward but direct measurement of the pressure drop across the same filter trap, having no particulates trapped therein but operating under identical flow conditions, is not possible and must be derived indirectly. One theoretical approach for estimating the clean, dimensionless pressure drop is disclosed in the Magaka et al, page 87, supra as follows:

$$\frac{\Delta P}{\frac{1}{2} \rho v^2} = k \cdot Re^x$$

wherein
k and x = empirically derived constants
Re = Reynolds number based on mass flow rate and fluid viscosity Direct measurement of these physical quantities are difficult so that indirect measurements have been used based on the speed density law using engine displacement, RPM, intake manifold pressure and temperature and engine volumetric efficiency information.

Attempts have been made to simplify the number of actual physical measurements required in a particulate regeneration control system such as disclosed in U.S. Pat. No. 4,608,640 to Shinzawa. Shinzawa '640 utilizes the pressure drop across the filter trap and a variable limit determined as a function of the inlet trap pressure. This approach ignores gas viscosity variation which is quite large over the normal operating range of a diesel engine. Similarly flawed approaches are disclosed in U.S. Pat. Nos. 4,630,438, 4,603,550, and 4,567,725 to Shinzawa. In another Shinzawa patent (U.S. Pat. No. 4,610,138) the pressure ratio across the trap is used as an indication of trap loading. While possibly of greater utility, this approach is still an incomplete picture of the true relationship between the flow parameters and mass loading.

The patent to Tagaki (U.S. Pat. No. 4,492,079) plots trap differential pressure vs. trap outlet pressure in a system that does not simply discharge the trap into the atmosphere but rather flows the discharge through a length of pipe and then through a muffler. In effect, this uses the piping and muffler downstream of the trap as a flowmeter without any means for accounting for temperature effects. This is therefore extremely installation specific and very cumbersome to implement.

Another approach has been to construct a physical analog of a clean filter such as disclosed in U.S. Pat. No. 4,544,388 to Rao et al. wherein an open channel, honeycomb structure is placed upstream of the actual filter. This honeycomb structure is said to have a porosity which is much larger than the filter trap so that none of the particulates will become entrapped. While simple in concept, physical analogs of the type disclosed by Rao et al. suffer a number of disadvantages. For example, the large porosity necessary to insure that no particles become entrapped inherently causes the structure to be an inaccurate analog of the filter trap. Moreover, placement of the analog structure upstream of the actual filter trap renders the system susceptible to serious error should an exhaust leak occur anywhere between the analog structure and the downstream side of the filter trap.

A need therefore exists for a simple, inexpensive, yet highly accurate and reliable particulate trap regeneration control system which overcomes the prior art deficiencies noted above.

SUMMARY OF THE INVENTION

The primary object of this invention is to overcome the deficiencies of the prior art by providing apparatus for determining when to regenerate a particulate filter trap which is simple, inexpensive, yet highly accurate and reliable.

Another object of the subject invention is to provide apparatus for determining when to regenerate a particulate filter trap including a flow rate sensing means for generating a signal relating to the flow rate of the exhaust gas stream wherein the flow rate sensing means is located downstream of the particulate filter trap to render the system insensitive to exhaust gas leaks upstream of the particulate filter.

Still another object of the subject invention is to provide an apparatus for determining when to regenerate a particulate filter trap which is used to collect particulates from an exhaust gas stream whenever the particulate filter trap reaches the predetermined limit defined by the formula $$L = \frac{\Delta P}{C \cdot V^D}$$

wherein

L = a dimensionless trap loading parameter representative of the mass loading of particles in the filter trap.
ΔP = differential pressure signal across the trap
V = volume flow rate (or velocity) of the exhaust gas stream at the trap inlet
C, D = predetermined constants empirically derived.

A still more specific object of the subject invention is the provision of apparatus for determining when to regenerate a particulate filter trap including a housing for the particulate trap having therein at least one vent tube for directing the exhaust gas stream exiting from the particulate filter trap toward an outlet of the housing and further including a flow rate sensing means formed by a vent differential pressure sensing means generating a differential pressure signal indicative of the fluid pressure drop in the exhaust gas stream as it passes through the vent tube.

A still more specific object of the subject invention is to provide an apparatus for determining when to regenerate a particulate filter trap as indicated above wherein the vent tube includes a venturi throat therein and wherein the flow rate sensing means includes a vent pressure sensing means for generating a pressure signal indicative of the differential fluid pressure in the exhaust gas stream as it passes through the venturi throat. By this structure, a highly accurate differential pressure signal can be derived across the entire operating range of a typical diesel engine.

A still more specific object of the subject invention is to provide apparatus for determining when to regenerate a particulate filter trap wherein the vent tube is sized in accordance with the operating characteristics of the associated internal combustion engine to produce a sufficiently accurate differential pressure signal to allow accurate determination of the particulates within the particulate filter trap while minimizing the overall exhaust stream flow path restriction. In particular, the vent tube includes a venturi throat of a high recovery type with an inlet converging section having a truncated conical shape with a vertex angle between 19 and 23 degrees and an outlet diverging section having a truncated conical shape with a vertex angle between 5 and 15 degrees.

A still more specific object of the subject invention is to provide apparatus for determine when to regenerate a particulate filter trap including at least one vent tube at the outlet end of the particulate filter trap wherein the inlet end of the vent tube is both radially and axially secured whereas the outlet end is only radially secured to permit thermal expansion and contraction in length of the vent tube.

A still more specific object of the subject invention is to provide apparatus for determining when to regenerate a particulate filter trap including a control signal generating means for determining the mass loading of particulates within a particulate filter trap and for generating a control signal when the mass loading reaches a predetermined limit wherein the control signal generating means includes a digital electronic computer for receiving the signal from a flow rate sensing means to determine a differential pressure signal limit representative of the pressure drop across the particulate filter trap which would occur should the mass loading of particulates in the filter trap reach said predetermined limit and for causing the filter trap to be regenerated when the measured differential pressure across the trap reaches or surpasses the differential pressure signal limit.

It is another object of the present invention to provide apparatus for determining when to regenerate a particulate filter trap as described above wherein the digital electronic computer means includes a look-up table means including a plurality of stored predetermined limit values representing the maximum allowable differential pressure drop in the exhaust stream as it passes through the particulate filter trap at corresponding exhaust gas stream fluid flow rates and wherein the look-up table means operates to retrieve one of said limit values dependent upon the measured exhaust gas stream flow rate and finally wherein the digital electronic computer means includes comparing means comparing the retrieved limit value representing the maximum allowable differential pressure drop with the trap differential pressure signal to cause the trap to be regenerated when the trap differential pressure exceeds the retrieved limit value.

It is another object of this invention to provide apparatus for determining the loading of particulates in a particulate filter trap including a vent passage arranged to receive the exhaust gas exiting from the particulate filter trap wherein the vent passage is formed to create a pressure drop in the exhaust gas stream which can be measured for use in calculating the volume flow rate of the exhaust gas stream entering the vent passage. Determination of the flow rate of exhaust gas entering the trap also relies upon means for determining the temperature and absolute pressure in the exhaust gas stream as it enters the vent passage and also relies upon means for determining the temperature and pressure differences in the exhaust gas as it enters the trap and the vent passage to calculate the volume flow rate of exhaust gas as it enters the trap and still further relies upon means to use the calculated flow rate of the exhaust gas stream entering the filter trap and the pressure drop across the filter trap to determine the loading of particulates in the trap.

Other and more specific objects of the subject invention may be appreciated by reference to the following Brief Description of the Drawings and Detailed Description of the Invention.

DETAILED DESCRIPTION OF PREFERRED EMBODIMENT

Figure 1:
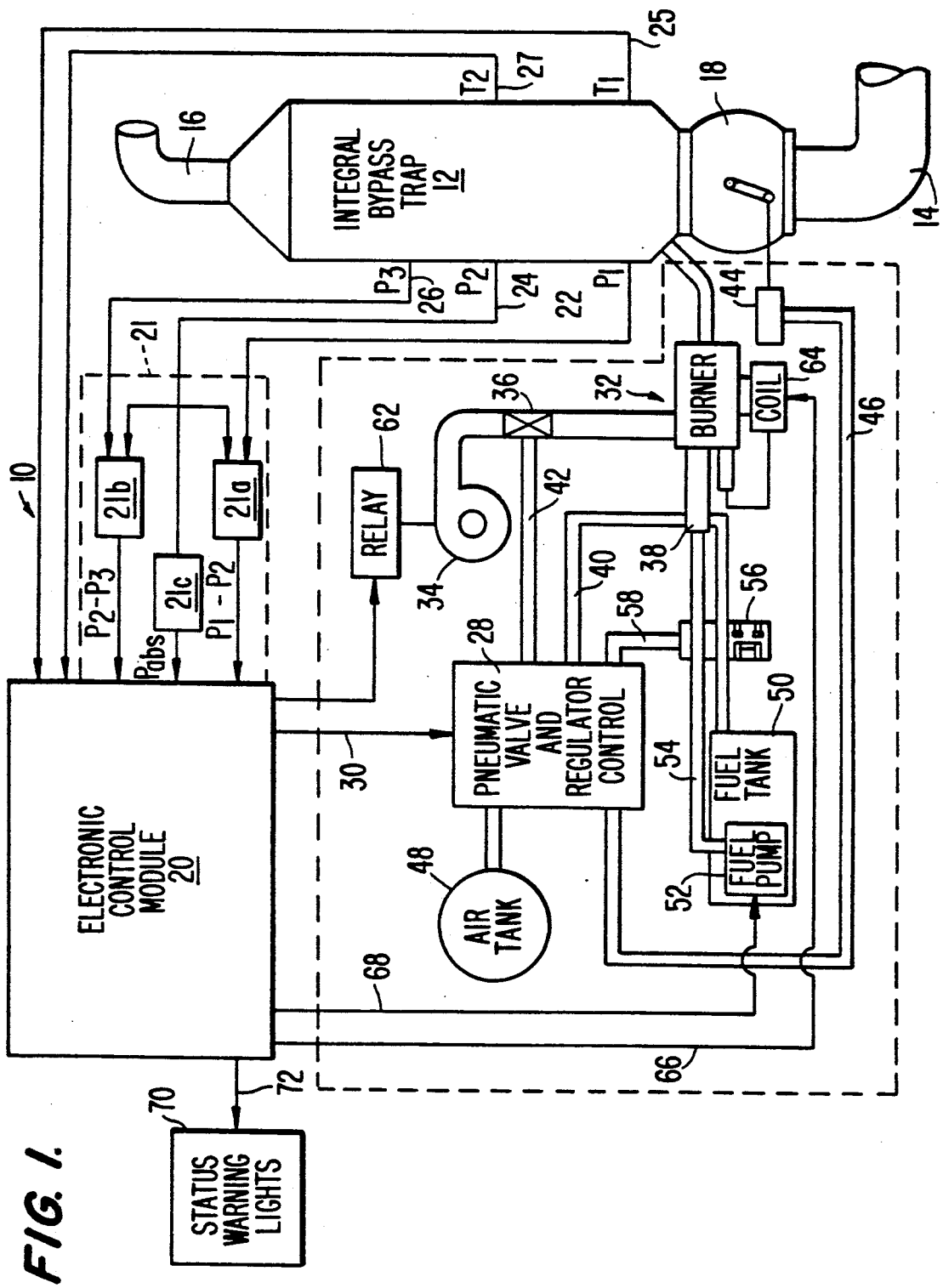
FIG. 1 is a schematic illustration of an integral bypass trap incorporating a particulate filter and including apparatus for regenerating the particulate filter trap designed in accordance with the subject invention.

Referring initially to FIG. 1, an overall schematic view of an integral bypass trap system 10 incorporating the subject invention is illustrated. An integral bypass trap 12 is shown connected at one end to an engine exhaust passage 14 and connected at the other end to an exhaust outlet passage 16. As will be explained more fully herein below, the integral bypass trap 12 includes a particulate filter trap adapted to receive the exhaust gases supplied through the engine exhaust passage 14 during the normal particulate trapping mode of operation. A honeycomb ceramic filter trap (such as illustrated in application Ser. No. 07/316,766, filed Feb. 28, 1989, is preferred but other suitably designed filtering medium can be employed if it can efficiently capture diesel particulates and is stable in the engine exhaust environment and regeneration environment. Upon exiting the trap, the exhaust gases are directed to the exhaust outlet passage 16 via vent tubes (not illustrated) which will be described more fully hereinafter. Upon a determination that the particulate trap has reached a particulate loading limit, a bypass valve 18 is actuated to cause the exhaust gases supplied by passage 14 to be diverted around the loaded particulate filter trap and directed to the exhaust outlet passage 16 through either an alternate trap/vent tube set or through a noise control passage (muffler). Operation of the bypass valve 18 is controlled by an electronic control module 20 arranged to receive three separate pressure signals from the integral bypass trap 12. As explained more fully hereinbelow, the pressure signals indicate the pressure drop across the particulate filter trap, the pressure drop across the downstream vent tubes, and the absolute pressure of the vent tube inlet. Gas temperature measurements are also made at the inlet and outlet to the particulate filter trap to produce temperature signals $T_1$ and $T_2$. By means of a loading parameter formula constituting a portion of the subject invention, the pressure signals and temperature signals are employed to determine when to initiate filter trap regeneration hereinbelow.

Referring more specifically to FIG. 1, the pressure upstream of the particulate filter trap $P_1$ and the pressure downstream of the particulate filter trap $P_2$ is sensed and a signal thereof is sent to electronic control module 20 via signal lines 22 and 24, respectively. Third pressure signal, $P_3$, indicative of the pressure in the vent tube section of the integral bypass filter trap is sensed and a signal indicative thereof is transmitted to the electronic control module 20 via signal line 26. Pressure signals $P_1$, $P_2$ and $P_3$ may be fluidic or may be converted via a pressure transducer (not illustrated) into an electrical signal indicative of the corresponding pressure. As indicated by dashed lines 21, signals $P_1$, $P_2$ and $P_3$ may be electronically or fluidically converted into a trap differential pressure signal $P_1$-$P_2$ by a trap differential pressure sensing means 21a, into a vent differential pressure signal represented by the pressure drop, $P_2$-$P_3$ in the vent tube by a vent differential pressure sensing means 21b, and into an absolute pressure signal $P_2$ at the vent tube inlet by an absolute pressure sensing means 21c. The temperature, $T_1$ and $T_2$, of the gas at the inlet and outlet of the particulate filter trap are measured and converted into electrical signals supplied to the electronic control module 20 via lines 25 and 27, respectively. The exact manner by which these signals are used by the electronic control module 20 to determine the need for trap regeneration will be described in detail below.

When the electronic control module 20 determines that the particulate trap loading has reached a predetermined limit, a regeneration control signal is produced and forwarded to a pneumatic valve and regulator control 28 via signal line 30 the effect of which is to bypass engine exhaust around the loaded trap and initiate operation of a burner 32. As a result of burner operation, high temperature gas is caused to flow through the particulate filter trap of sufficient volume and temperature to commence and sustain burn-off of the particulates within the filter trap. The burner 32 includes a blower 34 for providing a flow of air to the burner system. The pneumatic valve and regulator control 28 also supplies air to a fuel-burner atomizer 38 through supply conduit 40 and controls the burner isolation valve 36 through conduit 42.

Bypass valve 18 is moved from its normal operating mode into its bypass mode via actuator 44 controlled by the pneumatic valve and regulator control 28 through conduit 46. A source of pressurized air for regulator control 28 is provided from the pressurized air tank 48 with which over the road vehicles, such as trucks, are typically equipped. Fuel is supplied to the fuel-burner atomizer 38 from the fuel tank 50 by means of a fuel pump 52 and a fuel line 54. A control valve 56 is operated by regulator control 28 through conduit 58. The electronic control module 20 operate blower 34 by actuating a relay 60 via conductor 62. The coil 64, adapted to the burner, is actuated through conductor 66 by the electronic control module 20. The fuel pump is energized via conductor 68. Finally, with respect to FIG. 1, a series of status and warning lights 70 are provided for the convenience of the operator and are actuated by the electronic control module 20 via electrical conductor 72. In order to determine whether the burn-off of particulates is proceeding within defined limits, temperature measurements are made both upstream and downstream of the particulate trap and signals representative thereof are transmitted to the electronic control module 20 via signal lines 74 and 76, respectively.

Figure 2:
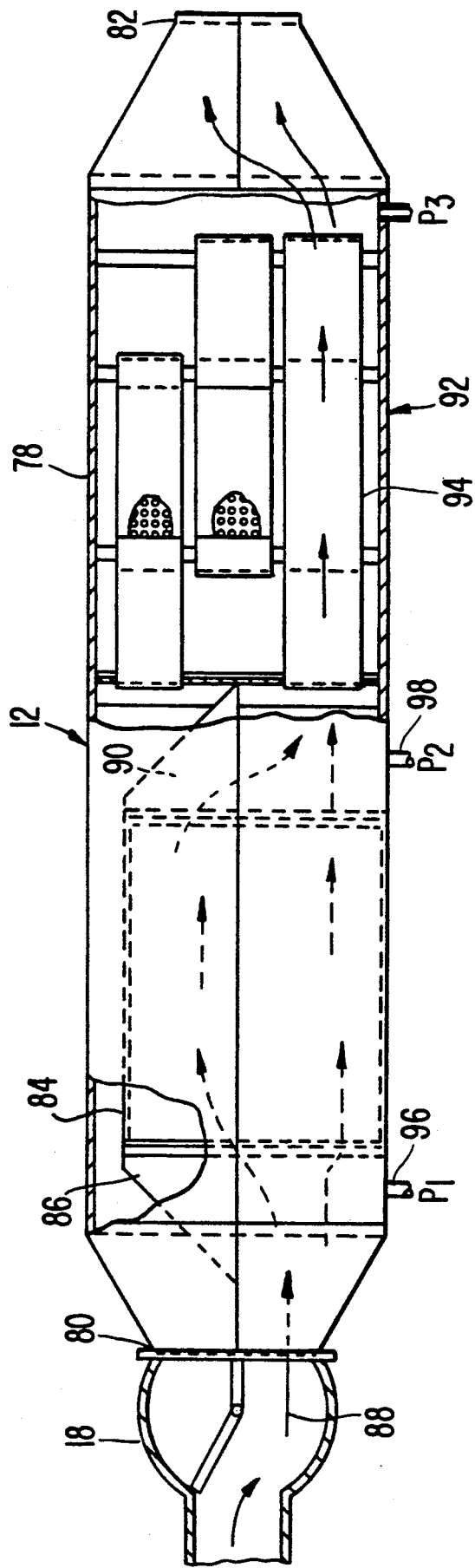
FIG. 2 is a partially cutaway cross-sectional view of the integral bypass trap shown in FIG. 1 and operating in a particulate trapping mode.

Reference is now made to FIG. 2 which discloses in more detail the internal configuration of the integral bypass trap and associated bypass valve 18 designed in accordance with the subject invention. In particular, FIG. 2 shows that the integral bypass trap 12 includes an outer housing 78 having an inlet 80 at one end and an outlet 82 at the other. Adjacent the inlet 80 is a monolithic ceramic particulate trap 84 or other filter medium suitably designed for diesel particulate filtration. This trap may be manufactured in accordance with the teaching contained in commonly assigned U.S. patent application Ser. No. 07/316,766 filed Feb. 28, 1989, incorporated herein by reference. Trap inlet 84 is connected to housing inlet 80 through an inlet header 86 and is adapted to receive the entire exhaust gas flow, represented by arrows 88 so long as the bypass valve 18 is operating in its trapping mode as illustrated in FIG. 2. An exhaust header 90 is designed to direct the gas exiting from trap 84 into a vent tube section 92 of the integral bypass trap 12. Vent tube section 92 includes at least one (preferably two) vent tube(s) 94 mounted to receive the exhaust gas from header 90 and direct the exhaust gas toward outlet 82 of the housing 78. As will be explained more fully hereinbelow, the pressure drop through vent tube 94, if properly formed, can be used to determine the flow rate of exhaust gas stream 88 through trap 84. Using the vent tubes, which are located downstream of particulate trap 84, has particular utility because it renders the system insensitive to exhaust gas leaks that may occur at or upstream of outlet header 90. The pressure drop across particulate trap 84 may be sensed via pressure sensing taps 96 and 98 communicating respectively with the interiors of inlet header 86 and exhaust header 90, respectively.

Figure 3:
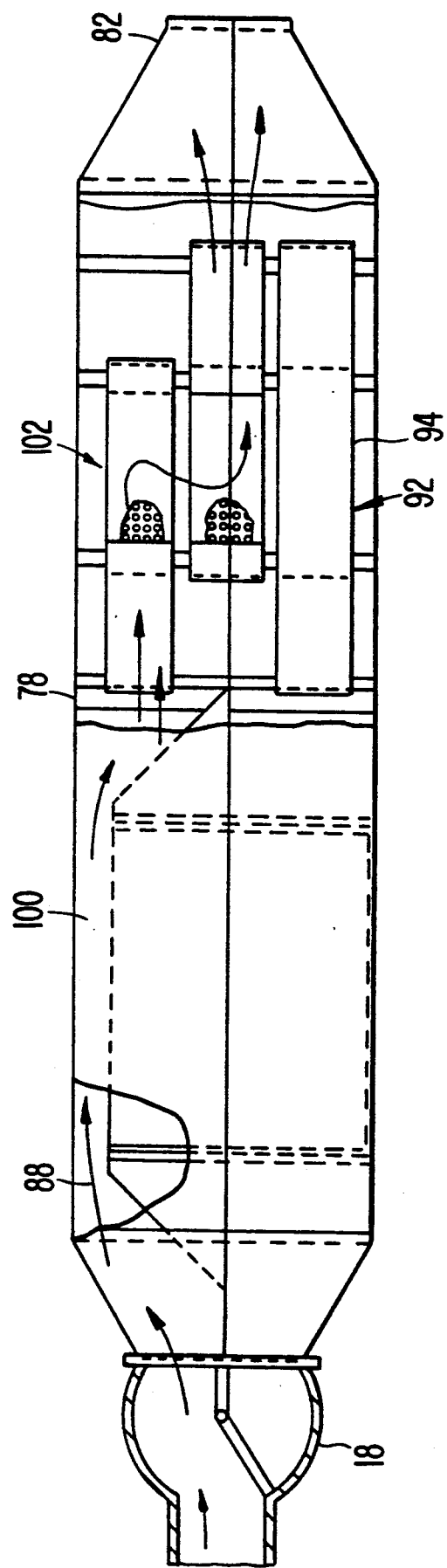
FIG. 3 is a partially cutaway cross-sectional view of the integral bypass trap illustrated in FIG. 1 operating in a bypass mode.

When the electronic control module 20 (FIG. 1) ascertains via receipt of pressure signals $P_1$, $P_2$ and $P_3$. and temperature signals $T_1$ and $T_2$ that trap regeneration is desirable, a regeneration control signal is generated, as explained above, which has the effect of moving bypass valve 18 from its trapping mode as shown in FIG. 2 to its bypass mode as shown in FIG. 3. When so adjusted, the exhaust gas stream 88 is caused to flow through a bypass passage 100 which is fluidically isolated from the exhaust gas passage flowing through inlet header 86, particulate trap 84, and outlet header 90. Exhaust bypass passage 100 directs the exhaust gas stream through a muffler section 102 which operates to suppress engine noise prior to the exhaust gas stream reaching housing outlet 82. Muffler section 102 is mounted internally within housing 78 adjacent to vent tubes 94.

Figure 4:
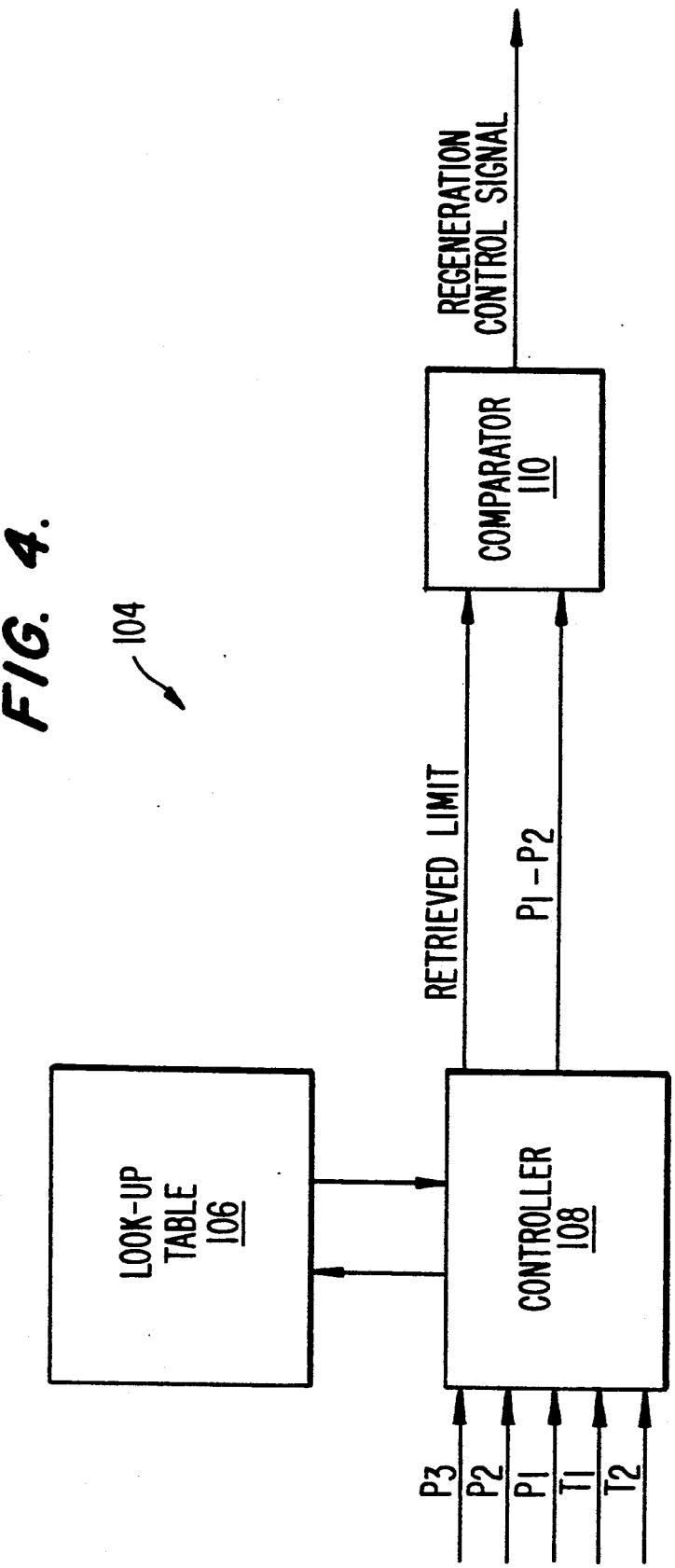
FIG. 4 is a schematic illustration of a digital electronic computer arranged to receive pressure signals from the integral bypass trap and to generate therefrom a control signal for initiating regeneration of the particulate trap in accordance with a control law which forms part of the subject invention.

To understand more thoroughly the theoretical basis for the subject invention, reference is now made to FIG. 4 which discloses schematically a digital electronic computer means 104 forming part of the electronic control module 20 which is programmed to implement the novel control system of the subject invention. In particular, the control scheme which forms an important part of the subject invention is based upon the discovery that the dimensionless loading parameter defined in the prior art as the pressure drop across a loaded particulate trap divided by the pressure drop across an identical, clean trap under the same flow conditions can be more accurately determined by means of the following formula:

$$L = \frac{\Delta P}{C \cdot V_T^D}$$

wherein
L = a dimensionless trap loading parameter representative of the mass loading of particulates in the filter trap
$\Delta P$ = differential pressure across the loaded trap
$V_T$ = volume flow rate (or velocity) of the exhaust gas stream at the trap inlet
C, D = predetermined constants empirically derived.

Because the direct measure of volume flow rate $V_T$ of exhaust gas at the inlet of the particulate trap is quite difficult, the present invention includes the concept of determining first the volume flow rate through the venturi tube which is then corrected for the pressure and temperature differences that exist between the venturi inlet and the trap inlet. Accordingly, as illustrated in FIG. 4, five measured parameters are necessary to implement the subject invention, namely

| | |
|---|---|
| (1) trap differential pressure | (P1-P2) |
| (2) venturi differential pressure (inlet-to-throat) | (P2-P3) |
| (3) venturi inlet absolute pressure | P2 |
| (4) trap inlet temperature | T1 |

| (5) trap outlet temperature | T2 |
|---|---|

Note: The point of measurement of the absolute pressure (3) is irrelevant since knowledge of absolute pressure at any of the three points plus the two differentials provides knowledge of the absolute pressure at any of the three points The gas volume flow rate for a venturi is given as:

$$V_{venturi} = K_v \left[ \frac{DP_V * T_V}{P_v} \right]^{0.5}$$

where
$K_v$=venturi calibration constant
$DP_v$=venturi differential pressure (P2-P3)
$T_v$=venturi inlet absolute temperature (T2)
$P_v$=venturi inlet absolute pressure (P2)

The gas volume flow rate at the trap inlet, which is "$V_T$" as used in the "L" equation, is determined by correcting for the pressure and temperature difference between trap outlet (venturi inlet) and trap inlet:

$$V_T = V_{venturi} * \left[ \frac{T1 * P2}{T2 * P1} \right]$$

where P1 is computed from the absolute pressure at the trap outlet plus the differential pressure across the trap:

P1=P2+(P1-P2)

As is now apparent, vent tube section 92 (and the associated sensors for determining the pressure drop P2-P3 and the absolute pressure and temperature at the vent tube inlet) constitutes a downstream flow rate sensing means for determining the exhaust gas flow rate at a point downstream of the particulate trap. This downstream flow rate can then be corrected for differences in pressure and temperature to provide a signal representative of gas flow rate at the inlet of the particulate trap.

For a given particulate filter trap, constants C and D of the formula for the dimensionless trap loading parameter L can be determined empirically in the following manner. Two identically formed traps are placed in series in the exhaust gas stream of an internal combustion engine. The engine is operated over a wide range of operating conditions to establish data points and a wide range of fluid flow rate and temperature combinations at which the formula $C \cdot V^D$ can be equated with the measured pressure drop across the downstream filter which is assumed to be operating in its clean condition. Once the values for C and D are established for a given filter design and installation, it becomes possible to compute a pressure drop limit at any given measured flow rate through the filter which would be indicative that the mass of trapped particulates within the filter had reached a predetermined limit as defined by the above formula for the dimensionless trap loading parameter L. In accordance with good programming practice and to simplify computer operation, a look-up table can be preprogrammed into the digital electronic computer means 104. By means of a look-up table, a plurality of stored, predetermined limit values are established wherein the values represent the maximum allowable differential pressure drop in the exhaust stream as it passes through the particulate filter trap at corresponding exhaust gas stream fluid flow rates. Such a look-up table means 106 is illustrated in FIG. 4 and is accessed at periodic intervals by controller 108 utilizing the calculated value for $V_T$ as determined from the five measurement parameters referred to above. Controller 108 also calculates the difference between $P_1$ and $P_2$ representative of the pressure drop across the particulate trap 84. Both the retrieved signal and the pressure drop across the particulate trap are forwarded to a comparator 110. When the pressure differential across the filter trap exceeds the retrieved limit, comparator 110 operates as a control signal generating means to generate a regeneration control signal to implement the trap regeneration mode of operation described above with reference to FIGS. 1, 2 and 3. Attached hereto as an appendix to this application is a computer program listing written for an Intel 8097 based controller in C computer language implementing the disclosed algorithms for producing a regeneration control signal.

Figure 5:
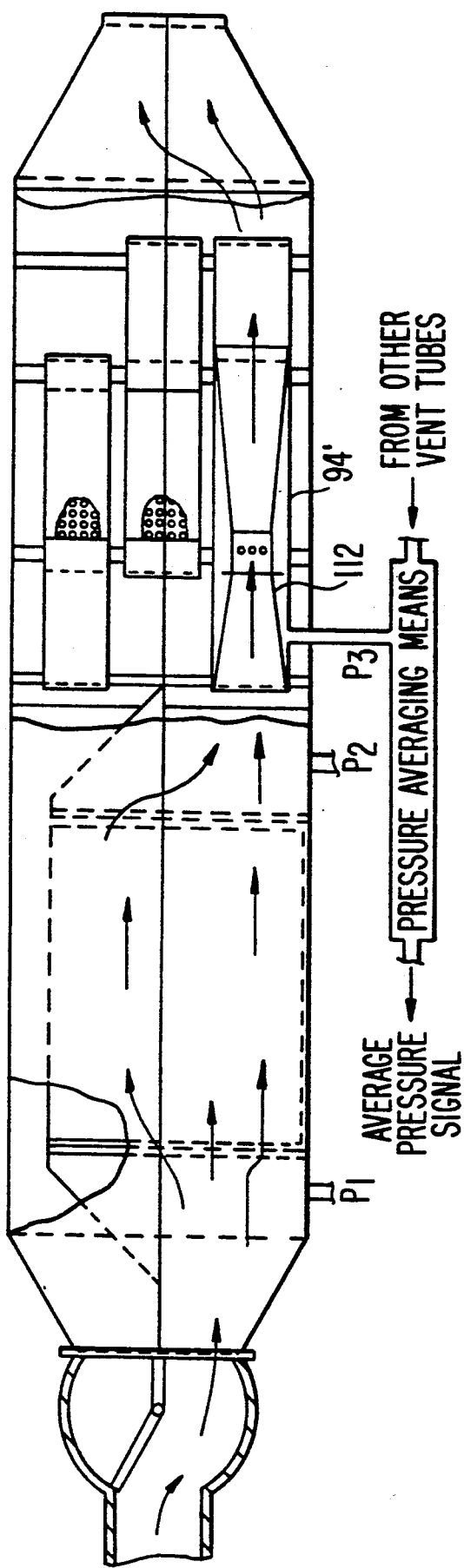
FIG. 5 is a partially cutaway cross-sectional view of the integral bypass trap illustrated in FIG. 1 and incorporating an alternative embodiment of the vent tube to produce a more accurate differential pressure signal over the entire range of engine operating conditions.

Referring now to FIG. 5, an alternative embodiment of the vent tube structure illustrated in FIGS. 2 and 3 is disclosed. In particular, FIG. 5 shows a cross-sectional view of a vent tube having a high recovery venturi throat mounted therein. This arrangement has been found to provide a more accurate pressure signal representative of exhaust gas stream flow velocity. In particular, the use of a Venturi throat improves significantly the accuracy of the pressure drop signal at low engine speed and load and thereby allows the regeneration system to operate safely at a higher dimensionless loading parameter L than would otherwise be possible.

Figure 6:
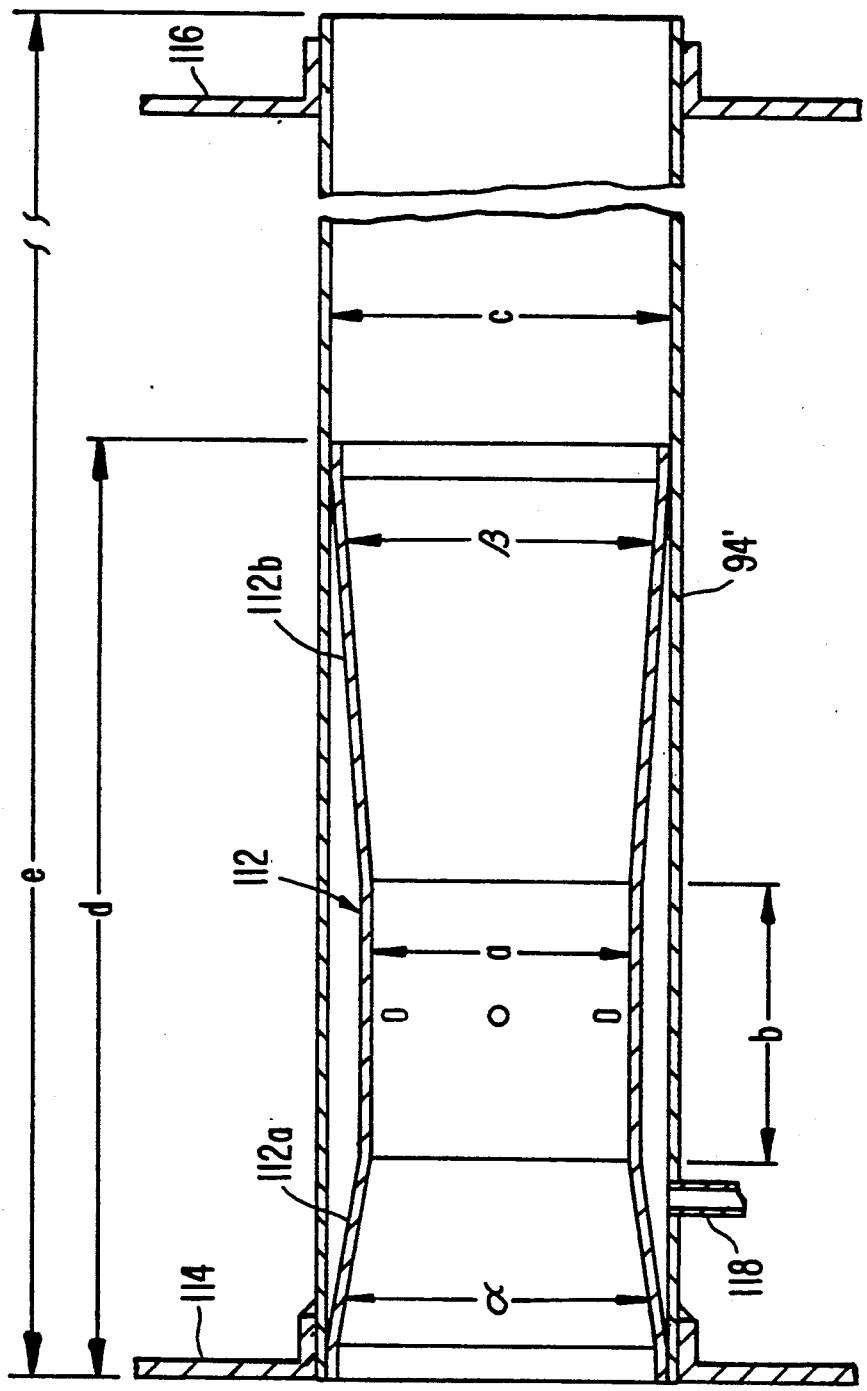
FIG. 6 is a cross-sectional view of the vent tube used in the integral bypass trap shown in FIG. 5.

Turning now to FIG. 6, the venturi throat is shown in an enlarged view and is shown to be mounted at the inlet end of a vent tube 94'. In order to provide a high recovery venturi throat, the inlet converging section 112a should have a truncated conical shape with a vertex angle between 19 and 23 degrees and an outlet diverging section 112b having a truncated conical shape with a vertex angle between 5 and 15 degrees. Ideally, the vent tube 94' is sized in accordance with the operating characteristics of the associated internal combustion engine to produce a sufficiently accurate differential pressure signal to allow the control signal generating means to determine accurately mass loading of particulates within the particulate filter trap. The vent tube should achieve this result while also minimizing the overall exhaust stream flow path restriction. In a typical installation a pair of vent tubes may be provided in parallel to handle all of the exhaust gas stream exiting the particulate filter. Such an arrangement will typically require a diameter c in the range of approximately 3 to 4 inches, e.g. 3.50 inches, a length e of approximately 15-25 inches, e.g. 20 inches, and a venturi inside throat diameter a of approximately 2.75 inches or less and a venturi throat length b of approximately 2.75 inches or less. With the construction shown in FIG. 6, a ring piezometer is formed by the vent tube 94' and the venturi 112, allowing the venturi throat pressure (P3) to be transmitted to pressure tap 118.

As illustrated in FIG. 6, the vent tube 94' is both axially and radially constrained by baffle 114 at the inlet end of the vent tube and is only radially constrained by baffle 116 at its outlet end in order to permit thermal contraction and expansion of the length of the vent tube. When so constrained, mounting of the venturi throat near the inlet end has the added advantage of minimizing the thermally induced strain on pressure tap 118. Positioning of the venturi throat at the inlet end of vent tube 94' also has the added advantage of minimizing losses to the tube since the conical inlet of the venturi is positioned in the airstream flow that wou'd otherwise typically separate from the inside wall of the vent tube. For example, see the theoretical explanation contained in the Mogaka et al. paper, page 85, supra.

The subject invention has been described with reference to an assembly in which the trap is contained in an integral housing which also includes the vent tube section and bypass/muffler section. Other packaging arrangements are possible and, under certain circumstances, more desirable. For example, the single housing may include a second trap and venturi section if no unfiltered exhaust gas can be allowed to escape. The same venturi section can serve both traps. Alternatively, entirely separate housings may be provided for the traps alone or for both the traps and the venturi sections.

INDUSTRIAL APPLICABILITY

The subject invention would find particular application to over the road trucks and buses equipped with diesel engines and subject to restricted particulate emissions control requirements and regulations. The subject invention would also find application wherever it becomes desirable to employ a trap regeneration system for an exhaust gas particulate filter trap adapted to trap exhaust gas particulates falling in the range of particulate material which can be removed by a monolithic ceramic filter trap or other suitably designed filtering medium.

APPENDIX

COMPUTER PROGRAM LISTINGS WRITTEN FOR INTEL 8097 MICROPROCESSOR IN C LANGUAGE

THREE MODULES OF THE TOTAL SOFTWARE PACKAGE THAT RELATE TO TRAP LOADING COMPUTATION

SCAN.C
CALC.C
L_DENOM LOOKUP TABLE

```
/*********************************************************************/
/*                                                                   */
/*    Routine that read H/W inputs for EAS system  File(SCAN.C)      */
/*                                                                   */
/*********************************************************************/
/*                                                                   */
/* REVISION:  DATE:      DESCRIPTION:                AUTHOR:         */
/*      0     11/10/87   Initial Release             C. Davis        */
/*                                                                   */
/*********************************************************************/
#include "define.dec"
#include "global.ref"

const char ext_mux_num[NUM_ANALOG_CHAN] = {0,0,0,0,0,0,0,0,0};
const char int_chan_num[NUM_ANALOG_CHAN] = {6,5,0,7,7,3,2,1,4};
void kick_dog();
void failure (int);

float lin_interp (float, float, float, int, float *);

void start_ad (ext_mux, int_mux)
        int ext_mux, int_mux;
        {
unsigned short del_time;
        ext_mux_sel = ext_mux;
        if (ext_mux != 0) {
                del_time = timer1 + muxed_delay;
                if (del_time <= timer1)
                        while (del_time <= timer1) ;
                while (del_time > timer1) ;
                }
        ad_command = (int_mux | 0x08);
        }
```

```
int get_ad(int_mux)
signed short int_mux;
{
        signed short err_flag;
        unsigned short time;
        unsigned short result;
        unsigned short temp;

/* Read current time and clear error flag */
        time = timer1;
        err_flag = 0;

/* Poll until A/D is done or 168 state times (42 usec) elapse */
        while ((ad_command & 0x08) && (err_flag == 0))
        {
                if ((time - timer1) > 168)
                        err_flag = 0x8000 | int_mux;
        }

/* Set channel number/err_flag pointer */
        if (int_mux != (int)(ad_command & 0x07))
                err_flag = 0x8000 | int_mux;

if (!err_flag)
                {
/* Return result in lower 10 bits of integer */
                result = ad_result_hi & 0x00ff;
                result = result << 2;
                temp = ad_result_lo >> 6;
                result = result | temp;
                return(result);
                }
        else
                return(err_flag);
} int filter_analog(index)
char index;
{
        char i;
        int max, min, total, current_read;
        static unsigned long noise_total;
        static float eng_gain, eng_offset;

const float one = 1.0 ;
        const float zero = 0.0;

const float *gain_ptr[9] = {
        &cal.dat.inlet_temp_gain,
        &cal.dat.outlet_temp_gain,
        &cal.dat.trap_out_press_gain,
        &cal.dat.temp_4_gain,
        &cal.dat.cold_j_temp_gain,
        &cal.dat.boost_press_gain,
        &cal.dat.trap_delta_press_gain,
        &cal.dat.vent_delta_press_gain,
        &one };

const float *offset_ptr[9] = {
        &cal.dat.inlet_temp_off,
        &cal.dat.outlet_temp_off,
        &cal.dat.trap_out_press_off,
        &cal.dat.temp_4_off,
        &cal.dat.cold_j_temp_off,
        &cal.dat.boost_press_off,
        &cal.dat.trap_delta_press_off,
        &cal.dat.vent_delta_press_off,
        &zero };

total = 0;
        max = 0;
        min = 0x3ff;
```

```
        for (i=0; i<10; i++) {
                current_read = analog_readings[index][i];
                if (current_read < min)
                        min = current_read;
                else if (current_read > max)
                        max = current_read;
                total += current_read;
                } total = (total - max - min + 4)/8;   /* add 4 to round result   */ if (noise_reset) {
                noise_total = 0;
                noise_time = 0;
                noise_min = 0X3FF;
                noise_max = 0;
                noise_reset = FALSE;
                eng_gain = *gain_ptr[noise_chan];
                eng_offset = *offset_ptr[noise_chan];
                } if (index == noise_chan) {
                if (noise_time < noise_max_time) {
                        noise_time++;
                        if (max > noise_max) noise_max = max;
                        if (min < noise_min) noise_min = min;
                        noise_total += total;
                        noise_ave = (float)noise_total / (float)noise_time;
                        kick_dog();
                        noise_max_eng = noise_max * eng_gain + eng_offset;
                        noise_ave_eng = noise_ave * eng_gain + eng_offset;
                        noise_min_eng = noise_min * eng_gain + eng_offset;
                        }
                } return (total);
}
void read_analog_inputs(index)
        char index;
        {
        char i;
        for (i=0; i<NUM_ANALOG_CHAN; i++) {
                start_ad(ext_mux_num[i],int_chan_num[i]);
                analog_readings[i][index] = get_ad(int_chan_num[i]);
                };
        } void scan_sensors(){
char ind;

if (LIVE) {
                inlet_temp_A_D = filter_analog(0);
                outlet_temp_A_D = filter_analog(1);
                trap_out_press_A_D = filter_analog(2);
                temp_4_A_D = filter_analog(3);
                cold_j_temp_A_D = filter_analog(4);
                boost_press_A_D = filter_analog(5);
                trap_delta_press_A_D = filter_analog(6);
                vent_delta_press_A_D = filter_analog(7);
                flame_sense_A_D = filter_analog(8);
                if (switch_inputs & TRAP_SENSE_MASK) bp_valve_sens_trap = TRUE;
                else bp_valve_sens_trap = FALSE;
                if (switch_inputs & BYPASS_SENSE_MASK) bp_valve_sens_bypass = TRUE;
                else bp_valve_sens_bypass = FALSE;
                } if (flame_sense_A_D > cal.dat.flame_sense_thresh) flame_sense = TRUE;
        else flame_sense = FALSE;
/*              calculate inlet temperature                     */
        inlet_resist = inlet_temp_A_D * cal.dat.inlet_temp_gain + cal.dat.inlet_temp_off ;
   inlet_temp_F = lin_interp (inlet_resist, first_resist, resist_increm, 15, temp_interp_tab);
        inlet_temp_K = (inlet_temp_F / 1.8) + 255.37 ;
        kick_dog();
/*              calculate outlet temperature                    */
        outlet_resist = outlet_temp_A_D * cal.dat.outlet_temp_gain + cal.dat.outlet_temp_off;
   outlet_temp_F = lin_interp (outlet_resist, first_resist, resist_increm, 15, temp_interp_tab);
        outlet_temp_K = (outlet_temp_F / 1.8) + 255.37 ;
        kick_dog();
```

```
if ((sensor_fault & BOOST_PRESS_FAULT) == 0)
    {
            boost_press_Hg = boost_press_A_D * cal.dat.boost_press_gain + cal.dat.boost_press_off;
    }
else /* Once a fault occurs, boost pressure will always read 0. */
    {
            boost_press_Hg = 0.;
    }
vent_delta_press_wcd = vent_delta_press_A_D * cal.dat.vent_delta_press_gain + cal.dat.vent_delta_press_off;
kick_dog();
trap_delta_press_wcd = trap_delta_press_A_D * cal.dat.trap_delta_press_gain + cal.dat.trap_delta_press_off;
trap_out_press_wca = trap_out_press_A_D * cal.dat.trap_out_press_gain + cal.dat.trap_out_press_off;
kick_dog();
boost_press_Pa = boost_press_Hg * Hg_to_Pa;
vent_delta_press_Pa = vent_delta_press_wcd * wcd_to_Pa;
kick_dog();
trap_delta_press_Pa = trap_delta_press_wcd * wcd_to_Pa;
trap_out_press_Pa = trap_out_press_wca * wcd_to_Pa;
kick_dog();
if (++slow_delta_ind > NUM_SLOW_SAMPS) slow_delta_ind = 0;
slow_delta_samp[slow_delta_ind] = trap_delta_press_wcd;
for (ind = 0, slow_delta_press = 0; ind < NUM_SLOW_SAMPS; ind++) slow_delta_press += slow_delta_samp[ind];
slow_delta_press = slow_delta_press / NUM_SLOW_SAMPS;
kick_dog();

return; } void set_outputs(){ static char temp;
        float float_temp;

temp = 0;
        if (!bp_valve_solenoid) temp = temp | BP_VALVE_SOL_MASK;
        if (!atom_air) temp = temp | ATOM_AIR_MASK;
        if (!ignitor) temp = temp | IGNITOR_MASK;
        if (!fuel_solenoid) temp = temp | FUEL_SOL_MASK;
        if (!blower) temp = temp | BLOWER_MASK;

ioport1 = temp;

float_temp = fuel_pump * fuel_pump_gain + cal.dat.base_fuel_pump_off ;
        if (float_temp < 0.0) float_temp = 0.0;
        else if (float_temp > 255.0) float_temp = 255.;
        fuel_pump_counts = float_temp;
        pwm_control = float_temp;

return; } void check_sensors()
{ if ((trap_delta_press_wcd < cal.dat.delta_press_min) ||
           (trap_delta_press_wcd > cal.dat.delta_press_max))
            {
                sensor_fault |= TRAP_DELTA_PRESS_FAULT;
            }
        else
            {
                    sensor_fault &= NOT_TRAP_DELTA_PRESS_FAULT;
            } if ((vent_delta_press_wcd < cal.dat.delta_press_min) ||
           (vent_delta_press_wcd > cal.dat.delta_press_max))
            {
                sensor_fault |= VENT_DELTA_PRESS_FAULT;
            }
        else
            {
                    sensor_fault &= NOT_VENT_DELTA_PRESS_FAULT;
            }
```

```
    if ((boost_press_Hg < cal.dat.boost_press_min) ||
       (boost_press_Hg > cal.dat.boost_press_max))
        {
            sensor_fault |= BOOST_PRESS_FAULT;
        }
    else
            {
                    sensor_fault &= NOT_BOOST_PRESS_FAULT;
            } if (((eng_rpm < cal.dat.RPM_low_thres) && (trap_delta_press_wcd > cal.dat.trap_delta_press_thesh)) ||
       (eng_rpm > cal.dat.RPM_max))
        {
            sensor_fault |= RPM_FAULT;
        }
    else
            {
                    sensor_fault &= NOT_RPM_FAULT;
            } if ((inlet_temp_F < cal.dat.inlet_temp_min) ||
   (inlet_temp_F > cal.dat.inlet_temp_max))
    {
        sensor_fault |= INLET_T_FAULT;
    }
    else
            {
                    sensor_fault &= NOT_INLET_T_FAULT;
            } if ((outlet_temp_F < cal.dat.outlet_temp_min) ||
   (outlet_temp_F > cal.dat.outlet_temp_max))
    {
        sensor_fault |= OUTLET_T_FAULT;
    }
    else
            {
                    sensor_fault &= NOT_OUTLET_T_FAULT;
            } if ((trap_out_press_wca < cal.dat.trap_out_press_min) ||
    (trap_out_press_wca > cal.dat.trap_out_press_max))
     {
         sensor_fault |= TRAP_OUT_PRESS_FAULT;
     }
    else
            {
                    sensor_fault &= NOT_TRAP_OUT_PRESS_FAULT;
            } if (flame_sense_A_D > cal.dat.flame_det_AD_max)
        {
            sensor_fault |= FLAME_DETECT_FAULT;
        }
    else
            {
                    sensor_fault &= NOT_FLAME_DETECT_FAULT;
            } if (veh_speed > cal.dat.MPH_max)
        {
            sensor_fault |= MPH_FAULT;
        }
    else
            {
                    sensor_fault &= NOT_MPH_FAULT;
            } if ((L < cal.dat.M_min) ||
       (L > cal.dat.M_max))
        {
            sensor_fault |= M_FAULT;
                 if (M_fail_time++ > cal.dat.M_fail_timeout)
            failure( (int)(256 + sensor_fault));
```

```
            }
        else
                {
                        sensor_fault &= NOT_M_FAULT;
                M_fail_time = 0;
                } if (((sensor_fault & SENSOR_SYSTEM_SHUTDOWN) && SAFE) != 0)
            {
                        if (sensor_fail_time++ > cal.dat.sensor_fail_timeout)
                        failure( (int)(256 + sensor_fault));
        }
    else
        sensor_fail_time = 0;

}

/******************************************************************/
/*                                                                */
/*      Routines that convert raw inputs into engineering units   */
/*        and perform calculations for EAS system     File(CALC.C)*/
/*                                                                */
/******************************************************************/
/*                                                                */
/* REVISION:  DATE:       DESCRIPTION:                AUTHOR:     */
/*      0     11/10/87    Initial Release             C. Davis    */
/*                                                                */
/******************************************************************/
#include "define.dec"
#include "global.ref"
extern float sqrt();
void kick_dog();

float lin_interp (in_value, first_val, increm, max_index, in_table)
float in_value, first_val, increm, in_table[];
int max_index;
{
float delta_val, temp_incr;
int i;

kick_dog();
        i = (in_value - first_val) / increm;
        delta_val = in_value - ((i * increm) + first_val);
        if (delta_val < 0.0) {
                i = i - 1;
                delta_val = delta_val + increm;
                }
        if (i < 0)
                return (in_table[0]);
        else
                if (i >= max_index)
                        return (in_table[max_index]);
                else {
                        temp_incr = in_table[i+1] - in_table[i];
                        return ((delta_val * temp_incr / increm) + in_table[i]);
                }
        } void calc_speeds() { eng_rpm = eng_rpm_counts * cal.dat.eng_rpm_gain + cal.dat.eng_rpm_off;
        veh_speed = veh_speed_counts * cal.dat.veh_speed_gain + cal.dat.veh_speed_off;
        if (LIVE && (regen_state != system_down) && (regen_state != alt_cutout) )
            {
                cumes[CUME_ENG_REV].fval += eng_rpm / 60000.;
                cumes[CUME_MILES].fval += veh_speed / 3600.;
            }
        eng_rpm_counts = 0;
        veh_speed_counts = 0;
        kick_dog();

return;}
```

```
void calc_M(){ float temp_vent_dp_Pa;
        int sign;

venturi_in_density = (trap_out_press_Pa) /
                         (287.05 * outlet_temp_K);

kick_dog();

/* FOR SQUARE ROOT OF VENTURI DELTA PRESS, TAKE ABSOLUTE */
    /* VALUE SO THAT SQUARE ROOT CAN BE CALCULATED.          */
    if (vent_delta_press_Pa >= 0)
        {
    temp_vent_dp_Pa = vent_delta_press_Pa;
    sign = 1;
        }
    else
        {
        temp_vent_dp_Pa = -vent_delta_press_Pa;
        sign = -1;
        };

kick_dog();

/* CALCULATE TRAP FLOW (USE BLOWER FLOW IF REGENERATING) */
if (bp_valve_solenoid)  /* NOT REGENERATING: CALCULATE TRAP FLOW */
    {
    trap_flow = venturi_in_density *
                (cal.dat.venturi_k1 +
                 cal.dat.venturi_k2 * sign * sqrt(temp_vent_dp_Pa)
                );
    trap_flow = trap_flow /
                (sqrt((trap_out_press_Pa)/outlet_temp_K));
    kick_dog();

/* IF TRAP FLOW IS LOW, THEN USE PSEUDO SPEED/DENSITY LAW */
    trap_flow_SCFM = trap_flow * kg_per_sec_to_SCFM;
    if (trap_flow_SCFM < cal.dat.venturi_threshold)
        trap_flow = eng_rpm * trap_out_press_Pa * cal.dat.engine_flow_constant * 0.000000001;
    }
else    /* BYPASS MODE: USER BLOWER FLOW IF BLOWER ON */
    {
    if (blower)
        trap_flow = cal.dat.burn_flow;
    else
        trap_flow = 0.0;
    };

kick_dog();
    trap_flow_SCFM = trap_flow * kg_per_sec_to_SCFM;
trap_flow_ACMS = trap_flow / trap_in_density;

/* INTEGRATE TRAP FLOW */
if (LIVE && (eng_rpm > 10.) && (regen_state != system_down) && (regen_state != alt_cutout))
        cumes[CUME_TRAP_FLOW].fval += trap_flow_SCFM / 60000.;

trap_temp = (inlet_temp_K + outlet_temp_K) / 2.;
kick_dog();
trap_temp_F = (inlet_temp_F + outlet_temp_F) / 2.;

viscosity = lin_interp (trap_temp, vis_first_val, vis_increm, vis_max_index, vis_inerp_tab);
kick_dog();
viscosity_display = viscosity * 1.E5;
exh_density = (trap_delta_press_Pa) / 287.05 / trap_temp;
kick_dog();
trap_flux = trap_flow / 0.7853982 / cal.dat.char_diam / cal.dat.char_diam;
Reynolds = trap_flux * cal.dat.char_diam / viscosity;
kick_dog();

trap_in_density = (trap_out_press_Pa + trap_delta_press_Pa)
                  / (287.05 * trap_temp);
```

```
if ((trap_flow > 0.) & (eng_rpm > 500.))
   {

DP_Star = (trap_delta_press_Pa * trap_in_density * 2)
              / (trap_flux * trap_flux);
    kick_dog();

if (cal.dat.reynolds_break == 0.0)
        {
         select_A_B = 3;
         DP_Star_Clean = cal.dat.A3 + cal.dat.B3 / Reynolds;
        }
    else
            {
             if (Reynolds > cal.dat.reynolds_break)
                 {
                  select_A_B = 2;
                  DP_Star_Clean = cal.dat.A2 + cal.dat.B2 / Reynolds;
                 }
             else
                 {
                  select_A_B = 1;
                  DP_Star_Clean = cal.dat.A1 + cal.dat.B1 / Reynolds;
                 }
            }

M_raw = DP_Star / DP_Star_Clean;
         kick_dog();
         L_raw = trap_delta_press_Pa /
                 lin_interp (trap_flow_ACMS,l_denom_breakpoint_0, l_denom_breakpoint_delta,
         l_denom_num_entries-1, l_denom_interp_tab);
         kick_dog();

if (M_raw > 100.)
             M_raw = 100.;
         else if (M_raw < 0.)
             M_raw = 0.;

if (M > 100.)
             M = 100.;
         else if (M < 0.)
             M = 0.;

if (L_raw > 100.)
             L_raw = 100.;
         else if (L_raw < 0.)
             L_raw = 0.;

if (L > 100.)
             L = 100.;
         else if (L < 0.)
             L = 0.;

kick_dog();
         M = M * cal.dat.Mfilter + M_raw * (1. - cal.dat.Mfilter);
         L = L * cal.dat.Mfilter + L_raw * (1. - cal.dat.Mfilter);

kick_dog();
        }
    else /* no trap flow or eng speed */
       {
        select_A_B = 0;
        L_raw = 1.0;
       };

return;
}
```

```
/*********************************************/
/*                                           */
/* L Denominator lookup table:               */
/*                                           */
/* Brkpts: trap volume flow (ACMS)           */
/* Output: C*ACMS^D    (Pascals differential)*/
/* [ ACMS = actual cubic meters per second ] */
/*                                           */
/*********************************************/
/*                                           */
/* Eng C = 1.285E-03 for C*ACFM^D  <<-- Enter*/
/* Eng D =    1.3384 for C*ACFM^D  <<-- These*/
/* SI  C = 9.043E+03 for C*ACMS^D            */
/* SI  D =    1.3384 for C*ACMS^D            */
/*                                           */
/*********************************************/ include "8096.h"
include "define.dec"

const float l_denom_interp_tab[l_denom_num_entries] =
{

/*********************************************/
/* OUTPUT       BREAKPOINT                   */
/* ------       ----------                   */
/*********************************************/
    0.000 ,/*   0.000  ACMS (   0.0 ACFM)*/
    2.208 ,/*   0.002  ACMS (   4.2 ACFM)*/
    5.583 ,/*   0.004  ACMS (   8.5 ACFM)*/
    9.607 ,/*   0.006  ACMS (  12.7 ACFM)*/
   14.119 ,/*   0.008  ACMS (  17.0 ACFM)*/
   19.033 ,/*   0.010  ACMS (  21.2 ACFM)*/
   24.293 ,/*   0.012  ACMS (  25.4 ACFM)*/
   29.859 ,/*   0.014  ACMS (  29.7 ACFM)*/
   35.702 ,/*   0.016  ACMS (  33.9 ACFM)*/
   41.798 ,/*   0.018  ACMS (  38.1 ACFM)*/
   48.128 ,/*   0.020  ACMS (  42.4 ACFM)*/
   54.676 ,/*   0.022  ACMS (  46.6 ACFM)*/
   61.429 ,/*   0.024  ACMS (  50.9 ACFM)*/
   68.376 ,/*   0.026  ACMS (  55.1 ACFM)*/
   75.505 ,/*   0.028  ACMS (  59.3 ACFM)*/
   82.810 ,/*   0.030  ACMS (  63.6 ACFM)*/
   90.281 ,/*   0.032  ACMS (  67.8 ACFM)*/
   97.911 ,/*   0.034  ACMS (  72.0 ACFM)*/
  105.696 ,/*   0.036  ACMS (  76.3 ACFM)*/
  113.628 ,/*   0.038  ACMS (  80.5 ACFM)*/
  121.702 ,/*   0.040  ACMS (  84.8 ACFM)*/
  129.915 ,/*   0.042  ACMS (  89.0 ACFM)*/
  138.261 ,/*   0.044  ACMS (  93.2 ACFM)*/
  146.736 ,/*   0.046  ACMS (  97.5 ACFM)*/
  155.337 ,/*   0.048  ACMS ( 101.7 ACFM)*/
  164.060 ,/*   0.050  ACMS ( 105.9 ACFM)*/
  172.902 ,/*   0.052  ACMS ( 110.2 ACFM)*/
  181.860 ,/*   0.054  ACMS ( 114.4 ACFM)*/
  190.931 ,/*   0.056  ACMS ( 118.7 ACFM)*/
  200.112 ,/*   0.058  ACMS ( 122.9 ACFM)*/
  209.401 ,/*   0.060  ACMS ( 127.1 ACFM)*/
  218.796 ,/*   0.062  ACMS ( 131.4 ACFM)*/
  228.293 ,/*   0.064  ACMS ( 135.6 ACFM)*/
  237.892 ,/*   0.066  ACMS ( 139.8 ACFM)*/
  247.589 ,/*   0.068  ACMS ( 144.1 ACFM)*/
  257.383 ,/*   0.070  ACMS ( 148.3 ACFM)*/
  267.273 ,/*   0.072  ACMS ( 152.6 ACFM)*/
  277.256 ,/*   0.074  ACMS ( 156.8 ACFM)*/
  287.331 ,/*   0.076  ACMS ( 161.0 ACFM)*/
  297.496 ,/*   0.078  ACMS ( 165.3 ACFM)*/
  307.749 ,/*   0.080  ACMS ( 169.5 ACFM)*/
  318.090 ,/*   0.082  ACMS ( 173.7 ACFM)*/
  328.516 ,/*   0.084  ACMS ( 178.0 ACFM)*/
  339.027 ,/*   0.086  ACMS ( 182.2 ACFM)*/
  349.621 ,/*   0.088  ACMS ( 186.5 ACFM)*/
  360.296 ,/*   0.090  ACMS ( 190.7 ACFM)*/
  371.052 ,/*   0.092  ACMS ( 194.9 ACFM)*/
  381.888 ,/*   0.094  ACMS ( 199.2 ACFM)*/
  392.802 ,/*   0.096  ACMS ( 203.4 ACFM)*/
  403.793 ,/*   0.098  ACMS ( 207.7 ACFM)*/
  414.860 ,/*   0.100  ACMS ( 211.9 ACFM)*/
  426.002 ,/*   0.102  ACMS ( 216.1 ACFM)*/
  437.219 ,/*   0.104  ACMS ( 220.4 ACFM)*/
  448.509 ,/*   0.106  ACMS ( 224.6 ACFM)*/
  459.871 ,/*   0.108  ACMS ( 228.8 ACFM)*/
  471.304 ,/*   0.110  ACMS ( 233.1 ACFM)*/
  482.808 ,/*   0.112  ACMS ( 237.3 ACFM)*/
  494.382 ,/*   0.114  ACMS ( 241.6 ACFM)*/
  506.025 ,/*   0.116  ACMS ( 245.8 ACFM)*/
  517.736 ,/*   0.118  ACMS ( 250.0 ACFM)*/
  529.514 ,/*   0.120  ACMS ( 254.3 ACFM)*/
  541.359 ,/*   0.122  ACMS ( 258.5 ACFM)*/
  553.270 ,/*   0.124  ACMS ( 262.7 ACFM)*/
  565.246 ,/*   0.126  ACMS ( 267.0 ACFM)*/
  577.286 ,/*   0.128  ACMS ( 271.2 ACFM)*/
  589.391 ,/*   0.130  ACMS ( 275.5 ACFM)*/
  601.558 ,/*   0.132  ACMS ( 279.7 ACFM)*/
  613.788 ,/*   0.134  ACMS ( 283.9 ACFM)*/
  626.080 ,/*   0.136  ACMS ( 288.2 ACFM)*/
  638.433 ,/*   0.138  ACMS ( 292.4 ACFM)*/
  650.847 ,/*   0.140  ACMS ( 296.6 ACFM)*/
  663.322 ,/*   0.142  ACMS ( 300.9 ACFM)*/
  675.855 ,/*   0.144  ACMS ( 305.1 ACFM)*/
  688.448 ,/*   0.146  ACMS ( 309.4 ACFM)*/
  701.100 ,/*   0.148  ACMS ( 313.6 ACFM)*/
  713.809 ,/*   0.150  ACMS ( 317.8 ACFM)*/
  726.576 ,/*   0.152  ACMS ( 322.1 ACFM)*/
  739.400 ,/*   0.154  ACMS ( 326.3 ACFM)*/
  752.280 ,/*   0.156  ACMS ( 330.5 ACFM)*/
  765.216 ,/*   0.158  ACMS ( 334.8 ACFM)*/
  778.208 ,/*   0.160  ACMS ( 339.0 ACFM)*/
  791.255 ,/*   0.162  ACMS ( 343.3 ACFM)*/
  804.356 ,/*   0.164  ACMS ( 347.5 ACFM)*/
  817.512 ,/*   0.166  ACMS ( 351.7 ACFM)*/
  830.721 ,/*   0.168  ACMS ( 356.0 ACFM)*/
  843.984 ,/*   0.170  ACMS ( 360.2 ACFM)*/
  857.300 ,/*   0.172  ACMS ( 364.4 ACFM)*/
  870.668 ,/*   0.174  ACMS ( 368.7 ACFM)*/
  884.088 ,/*   0.176  ACMS ( 372.9 ACFM)*/
  897.560 ,/*   0.178  ACMS ( 377.2 ACFM)*/
  911.084 ,/*   0.180  ACMS ( 381.4 ACFM)*/
  924.658 ,/*   0.182  ACMS ( 385.6 ACFM)*/
  938.283 ,/*   0.184  ACMS ( 389.9 ACFM)*/
  951.958 ,/*   0.186  ACMS ( 394.1 ACFM)*/
  965.682 ,/*   0.188  ACMS ( 398.3 ACFM)*/
  979.457 ,/*   0.190  ACMS ( 402.6 ACFM)*/
  993.280 ,/*   0.192  ACMS ( 406.8 ACFM)*/
 1007.153 ,/*   0.194  ACMS ( 411.1 ACFM)*/
 1021.073 ,/*   0.196  ACMS ( 415.3 ACFM)*/
 1035.042 ,/*   0.198  ACMS ( 419.5 ACFM)*/
 1049.059 ,/*   0.200  ACMS ( 423.8 ACFM)*/
 1063.124 ,/*   0.202  ACMS ( 428.0 ACFM)*/
 1077.235 ,/*   0.204  ACMS ( 432.3 ACFM)*/
 1091.393 ,/*   0.206  ACMS ( 436.5 ACFM)*/
 1105.598 ,/*   0.208  ACMS ( 440.7 ACFM)*/
 1119.850 ,/*   0.210  ACMS ( 445.0 ACFM)*/
 1134.147 ,/*   0.212  ACMS ( 449.2 ACFM)*/
 1148.490 ,/*   0.214  ACMS ( 453.4 ACFM)*/
 1162.879 ,/*   0.216  ACMS ( 457.7 ACFM)*/
 1177.312 ,/*   0.218  ACMS ( 461.9 ACFM)*/
 1191.791 ,/*   0.220  ACMS ( 466.2 ACFM)*/
 1206.314 ,/*   0.222  ACMS ( 470.4 ACFM)*/
 1220.881 ,/*   0.224  ACMS ( 474.6 ACFM)*/
 1235.493 ,/*   0.226  ACMS ( 478.9 ACFM)*/
 1250.148 ,/*   0.228  ACMS ( 483.1 ACFM)*/
 1264.847 ,/*   0.230  ACMS ( 487.3 ACFM)*/
 1279.589 ,/*   0.232  ACMS ( 491.6 ACFM)*/
 1294.375 ,/*   0.234  ACMS ( 495.8 ACFM)*/
 1309.205 ,/*   0.236  ACMS ( 500.1 ACFM)*/
 1324.073 ,/*   0.238  ACMS ( 504.3 ACFM)*/
 1338.986 ,/*   0.240  ACMS ( 508.5 ACFM)*/
 1353.942 ,/*   0.242  ACMS ( 512.8 ACFM)*/
 1368.939 ,/*   0.244  ACMS ( 517.0 ACFM)*/
 1383.977 ,/*   0.246  ACMS ( 521.2 ACFM)*/
```

| | | |
|---|---|---|
| 1399.058 ,/* | 0.248 | ACMS ( 525.5 ACFM)*/ |
| 1414.179 ,/* | 0.250 | ACMS ( 529.7 ACFM)*/ |
| 1429.341 ,/* | 0.252 | ACMS ( 534.0 ACFM)*/ |
| 1444.544 ,/* | 0.254 | ACMS ( 538.2 ACFM)*/ |
| 1459.788 ,/* | 0.256 | ACMS ( 542.4 ACFM)*/ |
| 1475.072 ,/* | 0.258 | ACMS ( 546.7 ACFM)*/ |
| 1490.396 ,/* | 0.260 | ACMS ( 550.9 ACFM)*/ |
| 1505.761 ,/* | 0.262 | ACMS ( 555.1 ACFM)*/ |
| 1521.164 ,/* | 0.264 | ACMS ( 559.4 ACFM)*/ |
| 1536.608 ,/* | 0.266 | ACMS ( 563.6 ACFM)*/ |
| 1552.091 ,/* | 0.268 | ACMS ( 567.9 ACFM)*/ |
| 1567.613 ,/* | 0.270 | ACMS ( 572.1 ACFM)*/ |
| 1583.173 ,/* | 0.272 | ACMS ( 576.3 ACFM)*/ |
| 1598.773 ,/* | 0.274 | ACMS ( 580.6 ACFM)*/ |
| 1614.411 ,/* | 0.276 | ACMS ( 584.8 ACFM)*/ |
| 1630.088 ,/* | 0.278 | ACMS ( 589.0 ACFM)*/ |
| 1645.803 ,/* | 0.280 | ACMS ( 593.3 ACFM)*/ |
| 1661.556 ,/* | 0.282 | ACMS ( 597.5 ACFM)*/ |
| 1677.346 ,/* | 0.284 | ACMS ( 601.8 ACFM)*/ |
| 1693.175 ,/* | 0.286 | ACMS ( 606.0 ACFM)*/ |
| 1709.041 ,/* | 0.288 | ACMS ( 610.2 ACFM)*/ |
| 1724.944 ,/* | 0.290 | ACMS ( 614.5 ACFM)*/ |
| 1740.884 ,/* | 0.292 | ACMS ( 618.7 ACFM)*/ |
| 1756.862 ,/* | 0.294 | ACMS ( 623.0 ACFM)*/ |
| 1772.876 ,/* | 0.296 | ACMS ( 627.2 ACFM)*/ |
| 1788.927 ,/* | 0.298 | ACMS ( 631.4 ACFM)*/ |
| 1805.014 ,/* | 0.300 | ACMS ( 635.7 ACFM)*/ |
| 1821.138 ,/* | 0.302 | ACMS ( 639.9 ACFM)*/ |
| 1837.297 ,/* | 0.304 | ACMS ( 644.1 ACFM)*/ |
| 1853.493 ,/* | 0.306 | ACMS ( 648.4 ACFM)*/ |
| 1869.725 ,/* | 0.308 | ACMS ( 652.6 ACFM)*/ |
| 1885.992 ,/* | 0.310 | ACMS ( 656.9 ACFM)*/ |
| 1902.295 ,/* | 0.312 | ACMS ( 661.1 ACFM)*/ |
| 1918.634 ,/* | 0.314 | ACMS ( 665.3 ACFM)*/ |
| 1935.008 ,/* | 0.316 | ACMS ( 669.6 ACFM)*/ |
| 1951.416 ,/* | 0.318 | ACMS ( 673.8 ACFM)*/ |
| 1967.860 ,/* | 0.320 | ACMS ( 678.0 ACFM)*/ |
| 1984.339 ,/* | 0.322 | ACMS ( 682.3 ACFM)*/ |
| 2000.852 ,/* | 0.324 | ACMS ( 686.5 ACFM)*/ |
| 2017.399 ,/* | 0.326 | ACMS ( 690.8 ACFM)*/ |
| 2033.982 ,/* | 0.328 | ACMS ( 695.0 ACFM)*/ |
| 2050.598 ,/* | 0.330 | ACMS ( 699.2 ACFM)*/ |
| 2067.248 ,/* | 0.332 | ACMS ( 703.5 ACFM)*/ |
| 2083.933 ,/* | 0.334 | ACMS ( 707.7 ACFM)*/ |
| 2100.651 ,/* | 0.336 | ACMS ( 711.9 ACFM)*/ |
| 2117.403 ,/* | 0.338 | ACMS ( 716.2 ACFM)*/ |
| 2134.189 ,/* | 0.340 | ACMS ( 720.4 ACFM)*/ |
| 2151.008 ,/* | 0.342 | ACMS ( 724.7 ACFM)*/ |
| 2167.860 ,/* | 0.344 | ACMS ( 728.9 ACFM)*/ |
| 2184.746 ,/* | 0.346 | ACMS ( 733.1 ACFM)*/ |
| 2201.664 ,/* | 0.348 | ACMS ( 737.4 ACFM)*/ |
| 2218.616 ,/* | 0.350 | ACMS ( 741.6 ACFM)*/ |
| 2235.600 ,/* | 0.352 | ACMS ( 745.8 ACFM)*/ |
| 2252.617 ,/* | 0.354 | ACMS ( 750.1 ACFM)*/ |
| 2269.667 ,/* | 0.356 | ACMS ( 754.3 ACFM)*/ |
| 2286.749 ,/* | 0.358 | ACMS ( 758.6 ACFM)*/ |
| 2303.863 ,/* | 0.360 | ACMS ( 762.8 ACFM)*/ |
| 2321.010 ,/* | 0.362 | ACMS ( 767.0 ACFM)*/ |
| 2338.189 ,/* | 0.364 | ACMS ( 771.3 ACFM)*/ |
| 2355.399 ,/* | 0.366 | ACMS ( 775.5 ACFM)*/ |
| 2372.642 ,/* | 0.368 | ACMS ( 779.7 ACFM)*/ |
| 2389.916 ,/* | 0.370 | ACMS ( 784.0 ACFM)*/ |
| 2407.222 ,/* | 0.372 | ACMS ( 788.2 ACFM)*/ |
| 2424.559 ,/* | 0.374 | ACMS ( 792.5 ACFM)*/ |
| 2441.928 ,/* | 0.376 | ACMS ( 796.7 ACFM)*/ |
| 2459.328 ,/* | 0.378 | ACMS ( 800.9 ACFM)*/ |
| 2476.759 ,/* | 0.380 | ACMS ( 805.2 ACFM)*/ |
| 2494.222 ,/* | 0.382 | ACMS ( 809.4 ACFM)*/ |
| 2511.715 ,/* | 0.384 | ACMS ( 813.6 ACFM)*/ |
| 2529.239 ,/* | 0.386 | ACMS ( 817.9 ACFM)*/ |
| 2546.794 ,/* | 0.388 | ACMS ( 822.1 ACFM)*/ |
| 2564.380 ,/* | 0.390 | ACMS ( 826.4 ACFM)*/ |
| 2581.996 ,/* | 0.392 | ACMS ( 830.6 ACFM)*/ |
| 2599.642 ,/* | 0.394 | ACMS ( 834.8 ACFM)*/ |
| 2617.319 ,/* | 0.396 | ACMS ( 839.1 ACFM)*/ |
| 2635.026 ,/* | 0.398 | ACMS ( 843.3 ACFM)*/ |
| 2652.764 ,/* | 0.400 | ACMS ( 847.6 ACFM)*/ |
| 2670.531 ,/* | 0.402 | ACMS ( 851.8 ACFM)*/ |
| 2688.328 ,/* | 0.404 | ACMS ( 856.0 ACFM)*/ |
| 2706.155 ,/* | 0.406 | ACMS ( 860.3 ACFM)*/ |
| 2724.012 ,/* | 0.408 | ACMS ( 864.5 ACFM)*/ |
| 2741.899 ,/* | 0.410 | ACMS ( 868.7 ACFM)*/ |
| 2759.815 ,/* | 0.412 | ACMS ( 873.0 ACFM)*/ |
| 2777.760 ,/* | 0.414 | ACMS ( 877.2 ACFM)*/ |
| 2795.735 ,/* | 0.416 | ACMS ( 881.5 ACFM)*/ |
| 2813.739 ,/* | 0.418 | ACMS ( 885.7 ACFM)*/ |
| 2831.772 ,/* | 0.420 | ACMS ( 889.9 ACFM)*/ |
| 2849.835 ,/* | 0.422 | ACMS ( 894.2 ACFM)*/ |
| 2867.926 ,/* | 0.424 | ACMS ( 898.4 ACFM)*/ |
| 2886.046 ,/* | 0.426 | ACMS ( 902.6 ACFM)*/ |
| 2904.195 ,/* | 0.428 | ACMS ( 906.9 ACFM)*/ |
| 2922.373 ,/* | 0.430 | ACMS ( 911.1 ACFM)*/ |
| 2940.579 ,/* | 0.432 | ACMS ( 915.4 ACFM)*/ |
| 2958.814 ,/* | 0.434 | ACMS ( 919.6 ACFM)*/ |
| 2977.078 ,/* | 0.436 | ACMS ( 923.8 ACFM)*/ |
| 2995.370 ,/* | 0.438 | ACMS ( 928.1 ACFM)*/ |
| 3013.690 ,/* | 0.440 | ACMS ( 932.3 ACFM)*/ |
| 3032.038 ,/* | 0.442 | ACMS ( 936.5 ACFM)*/ |
| 3050.414 ,/* | 0.444 | ACMS ( 940.8 ACFM)*/ |
| 3068.819 ,/* | 0.446 | ACMS ( 945.0 ACFM)*/ |
| 3087.251 ,/* | 0.448 | ACMS ( 949.3 ACFM)*/ |
| 3105.711 ,/* | 0.450 | ACMS ( 953.5 ACFM)*/ |
| 3124.199 ,/* | 0.452 | ACMS ( 957.7 ACFM)*/ |
| 3142.715 ,/* | 0.454 | ACMS ( 962.0 ACFM)*/ |
| 3161.259 ,/* | 0.456 | ACMS ( 966.2 ACFM)*/ |
| 3179.829 ,/* | 0.458 | ACMS ( 970.4 ACFM)*/ |
| 3198.428 ,/* | 0.460 | ACMS ( 974.7 ACFM)*/ |
| 3217.054 ,/* | 0.462 | ACMS ( 978.9 ACFM)*/ |
| 3235.707 ,/* | 0.464 | ACMS ( 983.2 ACFM)*/ |
| 3254.387 ,/* | 0.466 | ACMS ( 987.4 ACFM)*/ |
| 3273.094 ,/* | 0.468 | ACMS ( 991.6 ACFM)*/ |
| 3291.829 ,/* | 0.470 | ACMS ( 995.9 ACFM)*/ |
| 3310.590 ,/* | 0.472 | ACMS (1000.1 ACFM)*/ |
| 3329.379 ,/* | 0.474 | ACMS (1004.3 ACFM)*/ |
| 3348.194 ,/* | 0.476 | ACMS (1008.6 ACFM)*/ |
| 3367.036 ,/* | 0.478 | ACMS (1012.8 ACFM)*/ |
| 3385.905 ,/* | 0.480 | ACMS (1017.1 ACFM)*/ |
| 3404.800 ,/* | 0.482 | ACMS (1021.3 ACFM)*/ |
| 3423.722 ,/* | 0.484 | ACMS (1025.5 ACFM)*/ |
| 3442.670 ,/* | 0.486 | ACMS (1029.8 ACFM)*/ |
| 3461.645 ,/* | 0.488 | ACMS (1034.0 ACFM)*/ |
| 3480.646 ,/* | 0.490 | ACMS (1038.3 ACFM)*/ |
| 3499.674 ,/* | 0.492 | ACMS (1042.5 ACFM)*/ |
| 3518.727 ,/* | 0.494 | ACMS (1046.7 ACFM)*/ |
| 3537.807 ,/* | 0.496 | ACMS (1051.0 ACFM)*/ |
| 3556.913 ,/* | 0.498 | ACMS (1055.2 ACFM)*/ |
| 3576.045 ,/* | 0.500 | ACMS (1059.4 ACFM)*/ |
| 3595.202 ,/* | 0.502 | ACMS (1063.7 ACFM)*/ |
| 3614.386 ,/* | 0.504 | ACMS (1067.9 ACFM)*/ |
| 3633.595 ,/* | 0.506 | ACMS (1072.2 ACFM)*/ |
| 3652.830 ,/* | 0.508 | ACMS (1076.4 ACFM)*/ |
| 3672.091 ,/* | 0.510 | ACMS (1080.6 ACFM)*/ |
| 3691.377 ,/* | 0.512 | ACMS (1084.9 ACFM)*/ |
| 3710.689 ,/* | 0.514 | ACMS (1089.1 ACFM)*/ |
| 3730.026 ,/* | 0.516 | ACMS (1093.3 ACFM)*/ |
| 3749.388 ,/* | 0.518 | ACMS (1097.6 ACFM)*/ |
| 3768.776 ,/* | 0.520 | ACMS (1101.8 ACFM)*/ |
| 3788.189 ,/* | 0.522 | ACMS (1106.1 ACFM)*/ |
| 3807.628 ,/* | 0.524 | ACMS (1110.3 ACFM)*/ |
| 3827.091 ,/* | 0.526 | ACMS (1114.5 ACFM)*/ |
| 3846.579 ,/* | 0.528 | ACMS (1118.8 ACFM)*/ |
| 3866.093 ,/* | 0.530 | ACMS (1123.0 ACFM)*/ |
| 3885.631 ,/* | 0.532 | ACMS (1127.2 ACFM)*/ |
| 3905.195 ,/* | 0.534 | ACMS (1131.5 ACFM)*/ |
| 3924.783 ,/* | 0.536 | ACMS (1135.7 ACFM)*/ |
| 3944.396 ,/* | 0.538 | ACMS (1140.0 ACFM)*/ |
| 3964.033 ,/* | 0.540 | ACMS (1144.2 ACFM)*/ |
| 3983.695 ,/* | 0.542 | ACMS (1148.4 ACFM)*/ |
| 4003.382 ,/* | 0.544 | ACMS (1152.7 ACFM)*/ |
| 4023.093 ,/* | 0.546 | ACMS (1156.9 ACFM)*/ |

```
4042.829 ,/*   0.548  ACMS (1161.1 ACFM)*/
4062.589 ,/*   0.550  ACMS (1165.4 ACFM)*/
4082.373 ,/*   0.552  ACMS (1169.6 ACFM)*/
4102.182 ,/*   0.554  ACMS (1173.9 ACFM)*/
4122.015 ,/*   0.556  ACMS (1178.1 ACFM)*/
4141.872 ,/*   0.558  ACMS (1182.3 ACFM)*/
4161.753 ,/*   0.560  ACMS (1186.6 ACFM)*/
4181.658 ,/*   0.562  ACMS (1190.8 ACFM)*/
4201.588 ,/*   0.564  ACMS (1195.0 ACFM)*/
4221.541 ,/*   0.566  ACMS (1199.3 ACFM)*/
4241.518 ,/*   0.568  ACMS (1203.5 ACFM)*/
4261.518 ,/*   0.570  ACMS (1207.8 ACFM)*/
4281.543 ,/*   0.572  ACMS (1212.0 ACFM)*/
4301.591 ,/*   0.574  ACMS (1216.2 ACFM)*/
4321.663 ,/*   0.576  ACMS (1220.5 ACFM)*/
4341.759 ,/*   0.578  ACMS (1224.7 ACFM)*/
4361.878 ,/*   0.580  ACMS (1229.0 ACFM)*/
4382.020 ,/*   0.582  ACMS (1233.2 ACFM)*/
4402.186 ,/*   0.584  ACMS (1237.4 ACFM)*/
4422.376 ,/*   0.586  ACMS (1241.7 ACFM)*/
4442.588 ,/*   0.588  ACMS (1245.9 ACFM)*/
4462.824 ,/*   0.590  ACMS (1250.1 ACFM)*/
4483.084 ,/*   0.592  ACMS (1254.4 ACFM)*/
4503.366 ,/*   0.594  ACMS (1258.6 ACFM)*/
4523.672 ,/*   0.596  ACMS (1262.9 ACFM)*/
4544.000 ,/*   0.598  ACMS (1267.1 ACFM)*/
4564.352 ,/*   0.600  ACMS (1271.3 ACFM)*/
4584.726 ,/*   0.602  ACMS (1275.6 ACFM)*/
4605.124 ,/*   0.604  ACMS (1279.8 ACFM)*/
4625.544 ,/*   0.606  ACMS (1284.0 ACFM)*/
4645.987 ,/*   0.608  ACMS (1288.3 ACFM)*/
4666.453 ,/*   0.610  ACMS (1292.5 ACFM)*/
4686.942 ,/*   0.612  ACMS (1296.8 ACFM)*/
4707.453 ,/*   0.614  ACMS (1301.0 ACFM)*/
4727.987 ,/*   0.616  ACMS (1305.2 ACFM)*/
4748.544 ,/*   0.618  ACMS (1309.5 ACFM)*/
4769.123 ,/*   0.620  ACMS (1313.7 ACFM)*/
4789.724 ,/*   0.622  ACMS (1317.9 ACFM)*/
4810.348 ,/*   0.624  ACMS (1322.2 ACFM)*/
4830.995 ,/*   0.626  ACMS (1326.4 ACFM)*/
4851.663 ,/*   0.628  ACMS (1330.7 ACFM)*/
4872.354 ,/*   0.630  ACMS (1334.9 ACFM)*/
4893.067 ,/*   0.632  ACMS (1339.1 ACFM)*/
4913.803 ,/*   0.634  ACMS (1343.4 ACFM)*/
4934.560 ,/*   0.636  ACMS (1347.6 ACFM)*/
4955.340 ,/*   0.638  ACMS (1351.8 ACFM)*/
4976.142 ,/*   0.640  ACMS (1356.1 ACFM)*/
4996.965 ,/*   0.642  ACMS (1360.3 ACFM)*/
5017.811 ,/*   0.644  ACMS (1364.6 ACFM)*/
5038.679 ,/*   0.646  ACMS (1368.8 ACFM)*/
5059.568 ,/*   0.648  ACMS (1373.0 ACFM)*/
5080.480 ,/*   0.650  ACMS (1377.3 ACFM)*/
5101.413 ,/*   0.652  ACMS (1381.5 ACFM)*/
5122.367 ,/*   0.654  ACMS (1385.7 ACFM)*/
5143.344 ,/*   0.656  ACMS (1390.0 ACFM)*/
5164.342 ,/*   0.658  ACMS (1394.2 ACFM)*/
5185.362 ,/*   0.660  ACMS (1398.5 ACFM)*/
5206.403 ,/*   0.662  ACMS (1402.7 ACFM)*/
5227.466 ,/*   0.664  ACMS (1406.9 ACFM)*/
5248.550 ,/*   0.666  ACMS (1411.2 ACFM)*/
5269.656 ,/*   0.668  ACMS (1415.4 ACFM)*/
5290.783 ,/*   0.670  ACMS (1419.6 ACFM)*/
5311.932 ,/*   0.672  ACMS (1423.9 ACFM)*/
5333.102 ,/*   0.674  ACMS (1428.1 ACFM)*/
5354.293 ,/*   0.676  ACMS (1432.4 ACFM)*/
5375.505 ,/*   0.678  ACMS (1436.6 ACFM)*/
5396.739 ,/*   0.680  ACMS (1440.8 ACFM)*/
5417.993 ,/*   0.682  ACMS (1445.1 ACFM)*/
5439.269 ,/*   0.684  ACMS (1449.3 ACFM)*/
5460.566 ,/*   0.686  ACMS (1453.6 ACFM)*/
5481.884 ,/*   0.688  ACMS (1457.8 ACFM)*/
5503.223 ,/*   0.690  ACMS (1462.0 ACFM)*/
5524.583 ,/*   0.692  ACMS (1466.3 ACFM)*/
5545.963 ,/*   0.694  ACMS (1470.5 ACFM)*/
5567.365 ,/*   0.696  ACMS (1474.7 ACFM)*/
5588.787 ,/*   0.698  ACMS (1479.0 ACFM)*/
5610.230 ,/*   0.700  ACMS (1483.2 ACFM)*/
5631.694 ,/*   0.702  ACMS (1487.5 ACFM)*/
5653.179 ,/*   0.704  ACMS (1491.7 ACFM)*/
5674.684 ,/*   0.706  ACMS (1495.9 ACFM)*/
5696.210 ,/*   0.708  ACMS (1500.2 ACFM)*/
5717.756 ,/*   0.710  ACMS (1504.4 ACFM)*/
5739.323 ,/*   0.712  ACMS (1508.6 ACFM)*/
5760.911 ,/*   0.714  ACMS (1512.9 ACFM)*/
5782.519 ,/*   0.716  ACMS (1517.1 ACFM)*/
5804.147 ,/*   0.718  ACMS (1521.4 ACFM)*/
5825.796 ,/*   0.720  ACMS (1525.6 ACFM)*/
5847.465 ,/*   0.722  ACMS (1529.8 ACFM)*/
5869.155 ,/*   0.724  ACMS (1534.1 ACFM)*/
5890.865 ,/*   0.726  ACMS (1538.3 ACFM)*/
5912.595 ,/*   0.728  ACMS (1542.5 ACFM)*/
5934.345 ,/*   0.730  ACMS (1546.8 ACFM)*/
5956.115 ,/*   0.732  ACMS (1551.0 ACFM)*/
5977.906 ,/*   0.734  ACMS (1555.3 ACFM)*/
5999.717 ,/*   0.736  ACMS (1559.5 ACFM)*/
6021.547 ,/*   0.738  ACMS (1563.7 ACFM)*/
6043.398 ,/*   0.740  ACMS (1568.0 ACFM)*/
6065.269 ,/*   0.742  ACMS (1572.2 ACFM)*/
6087.160 ,/*   0.744  ACMS (1576.4 ACFM)*/
6109.070 ,/*   0.746  ACMS (1580.7 ACFM)*/
6131.001 ,/*   0.748  ACMS (1584.9 ACFM)*/
6152.951 ,/*   0.750  ACMS (1589.2 ACFM)*/
6174.921 ,/*   0.752  ACMS (1593.4 ACFM)*/
6196.911 ,/*   0.754  ACMS (1597.6 ACFM)*/
6218.921 ,/*   0.756  ACMS (1601.9 ACFM)*/
6240.950 ,/*   0.758  ACMS (1606.1 ACFM)*/
6263.000 ,/*   0.760  ACMS (1610.3 ACFM)*/
6285.068 ,/*   0.762  ACMS (1614.6 ACFM)*/
6307.157 ,/*   0.764  ACMS (1618.8 ACFM)*/
6329.265 ,/*   0.766  ACMS (1623.1 ACFM)*/
6351.392 ,/*   0.768  ACMS (1627.3 ACFM)*/
6373.539 ,/*   0.770  ACMS (1631.5 ACFM)*/
6395.706 ,/*   0.772  ACMS (1635.8 ACFM)*/
6417.891 ,/*   0.774  ACMS (1640.0 ACFM)*/
6440.097 ,/*   0.776  ACMS (1644.3 ACFM)*/
6462.322 ,/*   0.778  ACMS (1648.5 ACFM)*/
6484.566 ,/*   0.780  ACMS (1652.7 ACFM)*/
6506.829 ,/*   0.782  ACMS (1657.0 ACFM)*/
6529.112 ,/*   0.784  ACMS (1661.2 ACFM)*/
6551.413 ,/*   0.786  ACMS (1665.4 ACFM)*/
6573.734 ,/*   0.788  ACMS (1669.7 ACFM)*/
6596.075 ,/*   0.790  ACMS (1673.9 ACFM)*/
6618.434 ,/*   0.792  ACMS (1678.2 ACFM)*/
6640.813 ,/*   0.794  ACMS (1682.4 ACFM)*/
6663.210 ,/*   0.796  ACMS (1686.6 ACFM)*/
6685.627 ,/*   0.798  ACMS (1690.9 ACFM)*/
6708.063 ,/*   0.800  ACMS (1695.1 ACFM)*/
6730.517 ,/*   0.802  ACMS (1699.3 ACFM)*/
6752.991 ,/*   0.804  ACMS (1703.6 ACFM)*/
6775.483 ,/*   0.806  ACMS (1707.8 ACFM)*/
6797.995 ,/*   0.808  ACMS (1712.1 ACFM)*/
6820.525 ,/*   0.810  ACMS (1716.3 ACFM)*/
6843.074 ,/*   0.812  ACMS (1720.5 ACFM)*/
6865.642 ,/*   0.814  ACMS (1724.8 ACFM)*/
6888.229 ,/*   0.816  ACMS (1729.0 ACFM)*/
6910.834 ,/*   0.818  ACMS (1733.2 ACFM)*/
6933.459 ,/*   0.820  ACMS (1737.5 ACFM)*/
6956.101 ,/*   0.822  ACMS (1741.7 ACFM)*/
6978.763 ,/*   0.824  ACMS (1746.0 ACFM)*/
7001.443 ,/*   0.826  ACMS (1750.2 ACFM)*/
7024.142 ,/*   0.828  ACMS (1754.4 ACFM)*/
7046.859 ,/*   0.830  ACMS (1758.7 ACFM)*/
7069.595 ,/*   0.832  ACMS (1762.9 ACFM)*/
7092.349 ,/*   0.834  ACMS (1767.1 ACFM)*/
7115.122 ,/*   0.836  ACMS (1771.4 ACFM)*/
7137.913 ,/*   0.838  ACMS (1775.6 ACFM)*/
7160.723 ,/*   0.840  ACMS (1779.9 ACFM)*/
7183.551 ,/*   0.842  ACMS (1784.1 ACFM)*/
7206.397 ,/*   0.844  ACMS (1788.3 ACFM)*/
7229.262 ,/*   0.846  ACMS (1792.6 ACFM)*/
```

```
7252.145 ,/*    0.848   ACMS (1796.8 ACFM)*/
7275.046 ,/*    0.850   ACMS (1801.0 ACFM)*/
7297.966 ,/*    0.852   ACMS (1805.3 ACFM)*/
7320.904 ,/*    0.854   ACMS (1809.5 ACFM)*/
7343.859 ,/*    0.856   ACMS (1813.8 ACFM)*/
7366.834 ,/*    0.858   ACMS (1818.0 ACFM)*/
7389.826 ,/*    0.860   ACMS (1822.2 ACFM)*/
7412.836 ,/*    0.862   ACMS (1826.5 ACFM)*/
7435.864 ,/*    0.864   ACMS (1830.7 ACFM)*/
7458.911 ,/*    0.866   ACMS (1835.0 ACFM)*/
7481.975 ,/*    0.868   ACMS (1839.2 ACFM)*/
7505.058 ,/*    0.870   ACMS (1843.4 ACFM)*/
7528.158 ,/*    0.872   ACMS (1847.7 ACFM)*/
7551.276 ,/*    0.874   ACMS (1851.9 ACFM)*/
7574.413 ,/*    0.876   ACMS (1856.1 ACFM)*/
7597.567 ,/*    0.878   ACMS (1860.4 ACFM)*/
7620.739 ,/*    0.880   ACMS (1864.6 ACFM)*/
7643.929 ,/*    0.882   ACMS (1868.9 ACFM)*/
7667.136 ,/*    0.884   ACMS (1873.1 ACFM)*/
7690.362 ,/*    0.886   ACMS (1877.3 ACFM)*/
7713.605 ,/*    0.888   ACMS (1881.6 ACFM)*/
7736.866 ,/*    0.890   ACMS (1885.8 ACFM)*/
7760.144 ,/*    0.892   ACMS (1890.0 ACFM)*/
7783.440 ,/*    0.894   ACMS (1894.3 ACFM)*/
7806.754 ,/*    0.896   ACMS (1898.5 ACFM)*/
7830.086 ,/*    0.898   ACMS (1902.8 ACFM)*/
7853.435 ,/*    0.900   ACMS (1907.0 ACFM)*/
7876.801 ,/*    0.902   ACMS (1911.2 ACFM)*/
7900.186 ,/*    0.904   ACMS (1915.5 ACFM)*/
7923.587 ,/*    0.906   ACMS (1919.7 ACFM)*/
7947.007 ,/*    0.908   ACMS (1923.9 ACFM)*/
7970.443 ,/*    0.910   ACMS (1928.2 ACFM)*/
7993.897 ,/*    0.912   ACMS (1932.4 ACFM)*/
8017.369 ,/*    0.914   ACMS (1936.7 ACFM)*/
8040.858 ,/*    0.916   ACMS (1940.9 ACFM)*/
8064.364 ,/*    0.918   ACMS (1945.1 ACFM)*/
8087.887 ,/*    0.920   ACMS (1949.4 ACFM)*/
8111.428 ,/*    0.922   ACMS (1953.6 ACFM)*/
8134.986 ,/*    0.924   ACMS (1957.8 ACFM)*/
8158.562 ,/*    0.926   ACMS (1962.1 ACFM)*/
8182.155 ,/*    0.928   ACMS (1966.3 ACFM)*/
8205.764 ,/*    0.930   ACMS (1970.6 ACFM)*/
8229.392 ,/*    0.932   ACMS (1974.8 ACFM)*/
8253.036 ,/*    0.934   ACMS (1979.0 ACFM)*/
8276.697 ,/*    0.936   ACMS (1983.3 ACFM)*/
8300.376 ,/*    0.938   ACMS (1987.5 ACFM)*/
8324.071 ,/*    0.940   ACMS (1991.7 ACFM)*/
8347.784 ,/*    0.942   ACMS (1996.0 ACFM)*/
8371.514 ,/*    0.944   ACMS (2000.2 ACFM)*/
8395.260 ,/*    0.946   ACMS (2004.5 ACFM)*/
8419.024 ,/*    0.948   ACMS (2008.7 ACFM)*/
8442.805 ,/*    0.950   ACMS (2012.9 ACFM)*/
8466.602 ,/*    0.952   ACMS (2017.2 ACFM)*/
8490.417 ,/*    0.954   ACMS (2021.4 ACFM)*/
8514.248 ,/*    0.956   ACMS (2025.6 ACFM)*/
8538.097 ,/*    0.958   ACMS (2029.9 ACFM)*/
8561.962 ,/*    0.960   ACMS (2034.1 ACFM)*/
8585.844 ,/*    0.962   ACMS (2038.4 ACFM)*/
8609.743 ,/*    0.964   ACMS (2042.6 ACFM)*/
8633.658 ,/*    0.966   ACMS (2046.8 ACFM)*/
8657.591 ,/*    0.968   ACMS (2051.1 ACFM)*/
8681.540 ,/*    0.970   ACMS (2055.3 ACFM)*/
8705.506 ,/*    0.972   ACMS (2059.6 ACFM)*/
8729.488 ,/*    0.974   ACMS (2063.8 ACFM)*/
8753.487 ,/*    0.976   ACMS (2068.0 ACFM)*/
8777.503 ,/*    0.978   ACMS (2072.3 ACFM)*/
8801.536 ,/*    0.980   ACMS (2076.5 ACFM)*/
8825.585 ,/*    0.982   ACMS (2080.7 ACFM)*/
8849.650 ,/*    0.984   ACMS (2085.0 ACFM)*/
8873.732 ,/*    0.986   ACMS (2089.2 ACFM)*/
8897.831 ,/*    0.988   ACMS (2093.5 ACFM)*/
8921.946 ,/*    0.990   ACMS (2097.7 ACFM)*/
8946.078 ,/*    0.992   ACMS (2101.9 ACFM)*/
8970.226 ,/*    0.994   ACMS (2106.2 ACFM)*/
8994.391 ,/*    0.996   ACMS (2110.4 ACFM)*/
9018.572 ,/*    0.998   ACMS (2114.6 ACFM)*/
9042.770 ,/*    1.000   ACMS (2118.9 ACFM)*/
);
```

What is claimed:

1. Apparatus for determining when to regenerate a particulate filter trap used to collect particulates from an exhaust gas stream of an internal combustion engine, comprising regenerative means operable in response to a control signal to regenerate the trap by causing the trapped particles to burn away;

trap differential pressure sensing means for generating a trap differential pressure signal indicative of the fluid pressure drop in the exhaust gas stream as it passes through the particulate filter trap;

flow rate sensing means located downstream of said particulate filter trap for generating a signal related to the volume flow rate of the exhaust gas stream downstream of the particulate filter trap; and control signal generating means connected with said trap differential pressure sensing means and with said flow rate sensing means for determining the mass loading of particulates within the particulate filter trap and for generating said control signal when the mass loading reaches a predetermined limit in a manner which is insensitive to exhaust gas leaks upstream of the particulate filter.

2. Apparatus for determining when to regenerate a particulate filter trap used to collect particulates from an exhaust gas stream of an internal combustion engine, comprising regenerative means operable in response to a control signal to regenerate the trap by causing the trapped particles to burn away;

trap differential pressure sensing means for generating a trap differential pressure signal indicative of the fluid pressure drop in the exhaust gas stream as it passes through the particulate filter trap;

flow rate sensing means for generating a signal related to the volume flow rate of the exhaust gas stream downstream of the particulate filter trap; and control signal generating means connected with said trap differential pressure sensing means and with said flow rate sensing means for determining the mass loading of particulates within the particulate filter trap and for generating said control signal when the mass loading reaches a predetermined limit in a manner which is insensitive to exhaust gas leaks upstream of the particulate filter, further including a housing for the particulate trap having an inlet for the exhaust gas stream upstream of the particulate trap and an outlet for the exhaust gas stream downstream of the particulate trap, said housing including at least one vent tube for directing the exhaust gas stream exiting from the particulate filter trap toward said outlet, said flow rate sensing means including vent differential pressure sensing means for generating a differential pressure signal indicative of the fluid pressure drop in the exhaust gas stream as it passes through said vent tube.

3. Apparatus as defined in claim 2, further including a by-pass passage extending between said inlet and said outlet, said by-pass passage being arranged to direct the exhaust gas stream around the particulate filter trap when the particulate filter trap is being regenerated.

4. Apparatus as defined in claim 3, wherein said by-pass passage is arranged to direct the exhaust gas stream around said vent tube.

5. Apparatus as defined in claim 3, for use with an internal combustion engine having a normal operating range, wherein said vent tube is formed to cause the fluid pressure drop sensed in association with said vent tube in combination with absolute pressure and temperature measurements to be related predictably to the flow rate of fluid through said vent tube throughout the entire normal operating range of the internal combustion engine.

6. Apparatus as defined in claim 5, wherein said housing includes a pair of said vent tubes operating in parallel to direct all of the exhaust gas stream exiting the particulate filter toward said outlet, said vent tube having a diameter in the range of approximately 3–4 inches and a length of approximately 15–25 inches.

7. Apparatus as defined in claim 5, wherein said vent tube includes a venturi throat and wherein said flow rate sensing mean includes vent differential pressure sensing means for generating a pressure signal indicative of the fluid pressure drop in the exhaust gas stream as it is flowing through said venturi throat.

8. Apparatus as defined in claim 3, wherein said housing includes a muffler means positioned within said by-pass passage adjacent said vent tube for suppressing engine noise carried by the exhaust gas stream while said particulate filter trap is being regenerated, said vent tube being arranged to direct the exhaust gas stream around said muffler means and through said housing outlet when the exhaust gas stream is passing through the particulate filter trap.

9. Apparatus as defined in claim 3, wherein said housing includes a plurality of vent tubes positioned to operate in parallel to direct the exhaust gas stream exiting from the particulate filter trap toward said outlet, said vent differential pressure sensing means including pressure averaging means for sensing the pressure in each said vent tube and for generating said differential pressure signal from the average of the pressure signals measured in said vent tubes.

10. Apparatus as defined in claim 7, wherein said venturi throat is a high recovery venturi throat with the inlet converging section having a truncated conical shape with a vertex angle between 19 and 23 degrees and an outlet diverging section having a truncated conical shape with a vertex angle between 5 and 15 degrees.

11. Apparatus as defined in claim 10, wherein said vent tube is sized in accordance with the operating characteristics of the associated internal combustion engine to produce a sufficiently accurate differential pressure signal to allow said control signal generating means to determine accurately the mass loading of particulates within the particulate filter trap while minimizing the overall exhaust stream flow path restriction created by said vent tube.

12. Apparatus as defined in claim 11, wherein said housing includes a pair of said vent tubes operating in parallel to direct all of the exhaust gas stream exiting the particulate filter toward said outlet, said vent tubes having a diameter in the range of approximately 3–4 inches, a length of approximately 15–25 inches and a venturi throat inside diameter of approximately 2.75 inches or less and a venturi throat length of approximately 2.75 inches or less.

13. Apparatus as defined in claim 7, further including support baffle means for radially and axially securing said vent tube at its inlet end to said housing and for radially securing said vent tube at its exit end in a manner to accommodate thermal expansion and contraction in length, said venturi throat being mounted adjacent said inlet end of said vent tube to minimize stress to said vent pressure sensing means induced by thermal expansion and contraction of said vent tube.

14. Apparatus as defined in claim 1, wherein said control signal generating means includes a digital electronic computer means for using the signal generated by said flow rate sensing means to determine a differential pressure signal limit representative of the pressure drop across the particulate filter trap which would occur should the mass loading of particulates in the filter trap reach said predetermined limit and for generating said control signal when the signal generated by said trap differential pressure sensing means reaches or surpasses said differential pressure signal limit.

15. Apparatus as defined in claim 14, further including first temperature sensing means for sensing the temperature of gas at the inlet of the trap and wherein said flow rate sensing means includes means for sensing the temperature and absolute pressure of gas entering said flow rate sensing means, and wherein said digital electronic computer means operates to determine the volume flow rate of gas entering the trap by correcting the volume flow rate determined by said flow rate sensing means using the temperature and pressure differences between the gases entering the trap and the flow rate sensing means.

16. Apparatus as defined in claim 14, wherein said digital electronic computer means includes look-up table means including a plurality of stored predetermined limit values representing the maximum allowable differential pressure drop in the exhaust stream as it passes through the particulate filter trap at corresponding exhaust gas stream fluid volume flow rates, said look-up table means operating to retrieve one of said limit values dependent upon the level of signal produced by said flow rate sensing means and comparing means for comparing the retrieved limit value representing the maximum allowable differential pressure drop with the signal generated by said trap differential pressure sensing means to cause said control signal to be generated when the signal generated by said trap differential pressure sensing means exceeds said retrieved limit value.

17. Apparatus for determining when to regenerate a particulate filter trap used to collect particulates from an exhaust gas stream of an internal combustion engine, comprising regenerative means operable in response to a control signal to regenerate the trap by causing the trapped particles to burn away;

trap differential pressure sensing means for generating a differential pressure signal indicative of the fluid pressure drop in the exhaust gas stream as it passes through the particulate filter trap;

flow rate sensing means for generating a signal related to the volume flow rate of the exhaust gas stream exiting from the particulate filter trap; and control signal generating means connected with said trap differential pressure sensing means and with said flow rate sensing means for generating said control signal when the mass loading of particulates within the particulate filter trap reaches a predetermined limit determined by the formula $$L = \frac{\Delta P}{C \cdot V^D}$$

wherein
- L = a dimensionless trap loading parameter representative of the mass loading of particles in the filter trap
- ΔP = differential pressure signal as measured by said trap differential pressure sensing means
- V = volume flow rate of the exhaust gas stream at the trap inlet
- C, D = predetermined constants empirically derived.

18. Apparatus as defined in claim 17, wherein constants C and D are empirically derived constants dependent on the flow characteristics of the particulate filter and the operating characteristics of the engine to which the apparatus is attached.

19. Apparatus as defined in claim 18, wherein said constants C and D are empirically derived by placing identical particulate filter traps of a predetermined design in series in the exhaust gas stream of a particular engine and measuring the pressure drop across the second particulate filter trap at various engine operating and exhaust flow and temperature conditions to empirically derive values representative of the pressure drop across a particulate filter of said predetermined design at the various operating and flow conditions when said filter is clean and using said empirically derived values to calculate said C and D constants based on the assumption that L for a given filter equals the pressure drop across the particulate filter under a particular set of operating and flow conditions divided by the pressure drop across the same filter under the same operating and flow conditions when the filter is clean.

20. Apparatus as defined in claim 17, wherein said control signal generating means includes a digital electronic computer means for using the signal generated by said flow rate sensing means to determine a differential pressure signal limit representative of the pressure drop across the particulate filter trap which would occur should the mass loading of particulates in the filter trap reach said predetermined limit and for generating said control signal when the signal generated by said trap differential pressure sensing means indicates that said trap differential pressure signal has reached or surpassed said differential pressure signal limit.

21. Apparatus as defined in claim 20, wherein said digital electronic computer means includes look up table means including a plurality of stored predetermined limit values representing the maximum allowable differential pressure drop in the exhaust stream as it passes through the particulate filter trap at corresponding exhaust gas stream fluid volume flow rates, said look-up table means operating to retrieve one of said limit values dependent upon the level of signal produced by said flow rate sensing means and comparing means for comparing the retrieved limit value representative to the maximum allowable differential pressure drop with the signal generated by said trap differential pressure sensing means to cause said control signal to be generated when the signal generated by said trap differential pressure sensing means exceeds said retrieved limit value.

22. Apparatus for determine the loading of particulates in a particulate filter trap used to collect particulates from an exhaust gas stream of an internal combustion engine, comprising
- vent means for receiving the exhaust gas stream exiting from the trap, said vent means including a vent passage shaped to create a pressure drop in the exhaust gas stream which can be used to calculate the volume flow rate of the exhaust gas stream as it enters said vent means at a point downstream of the trap,
- first temperature sensing means for sensing the temperature of the exhaust gas stream as it enters the trap,
- first pressure sensing means for sensing the pressure of the exhaust gas stream as it enters the trap,
- second temperature sensing means for sensing the temperature of the exhaust gas stream as it enters said vent means,
- second pressure sensing means for sensing the pressure of the exhaust gas stream as it enters said vent means,
- third pressure sensing means for sensing the pressure of the exhaust gas stream at some port within said vent means to determine said pressure drop in said vent passage, and
- control signal generating means connected with said temperature and pressure sensing means for generating a signal indicative of the loading of particulates in the trap by first calculating the volume flow rate of the exhaust gas entering said vent means and second by determining the flow rate of the exhaust gas as it enters the trap by correcting for temperature and pressure differentials in the exhaust gas streams entering the trap and vent means, respectively.

* * * * *

UNITED STATES PATENT AND TRADEMARK OFFICE
CERTIFICATE OF CORRECTION

PATENT NO. : 5,063,736

DATED : November 12, 1991

INVENTOR(S) : Walter J. Hough; Paul R. Miller

It is certified that error appears in the above-identified patent and that said Letters Patent is hereby corrected as shown below:

At column 1, after the Title, insert:

--A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.--

Column 12, line 18; column 14, line 1; column 16, line 1; column 18, line 1; column 20, line 1; column 22, line 1; column 24, line 1; column 26, line 1; column 28, line 1; column 30, line 1; column 32, line 1; column 34, line 1, insert:

--"(c) 1991 Cummins Engine Company, Inc."--

Signed and Sealed this

Thirteenth Day of April, 1993

*Attest:*

STEPHEN G. KUNIN

*Attesting Officer*      *Acting Commissioner of Patents and Trademarks*